US011628828B2

(12) United States Patent
Seki

(10) Patent No.: US 11,628,828 B2
(45) Date of Patent: Apr. 18, 2023

(54) VEHICLE CONTROLLING DEVICE AND COMPUTER READABLE RECORDING MEDIUM

(71) Applicant: SUBARU CORPORATION, Tokyo (JP)

(72) Inventor: Junya Seki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 153 days.

(21) Appl. No.: 16/460,331

(22) Filed: Jul. 2, 2019

(65) Prior Publication Data

US 2020/0101967 A1 Apr. 2, 2020

(51) Int. Cl.

| B60W 20/20 | (2016.01) |
| B60W 20/13 | (2016.01) |
| F02N 11/08 | (2006.01) |
| B60W 30/06 | (2006.01) |
| B60W 30/17 | (2020.01) |

(Continued)

(52) U.S. Cl.
CPC ............ B60W 30/06 (2013.01); B60W 30/17 (2013.01); G05D 1/0246 (2013.01); G06V 20/56 (2022.01); G05D 2201/0213 (2013.01)

(58) Field of Classification Search
None
See application file for complete search history.

(56) References Cited

U.S. PATENT DOCUMENTS

| 10,286,904 | B2 * | 5/2019 | Yaldo ....................... H04W 4/46 |
| 10,351,133 | B1 * | 7/2019 | Nave ....................... H04W 4/025 |
| 10,467,895 | B2 * | 11/2019 | Nordbruch ............. G08G 1/143 |

(Continued)

FOREIGN PATENT DOCUMENTS

| JP | 4457865 B2 | 4/2010 |
| JP | 2017-185954 A | 10/2017 |

(Continued)

OTHER PUBLICATIONS

Japanese Notice of Reasons for Refusal issued in corresponding Japanese Patent Application No. 2018-184260, dated Jul. 7, 2020, with English translation.

*Primary Examiner* — Aniss Chad
*Assistant Examiner* — Mahmoud M Kazimi
(74) *Attorney, Agent, or Firm* — McDermott Will & Emery LLP

(57) ABSTRACT

A vehicle controller includes a first estimator, a second estimator, and a first controller. The first estimator is configured to obtain first estimation information with regard to a target vehicle that stops in a pick-up area where a plurality of vehicles is allowed to stop waiting for a user to get therein. The first estimation information indicates whether the user of the target vehicle is carrying a large piece of luggage having a size equal to or greater than a predetermined size. The second estimator is configured to obtain second estimation information indicating an other-vehicle stopping status. The other-vehicle stopping status indicates a status of another vehicle stopping around the target vehicle. The first controller is configured to cause the other vehicle to move on the basis of the first estimation information obtained by the first estimator and the second estimation information obtained by the second estimator.

19 Claims, 10 Drawing Sheets

(51) Int. Cl.
  *G06V 20/56* (2022.01)
  *G05D 1/02* (2020.01)

(56) References Cited

U.S. PATENT DOCUMENTS

| | | | | |
|---|---|---|---|---|
| 11,066,867 B2* | 7/2021 | Seki | ................ | G07C 9/00309 |
| 2015/0350413 A1* | 12/2015 | Ma | ................ | G01C 21/362 |
| | | | | 455/418 |
| 2018/0261092 A1* | 9/2018 | Tsuyunashi | ............ | G08G 1/144 |
| 2020/0101967 A1* | 4/2020 | Seki | ................ | G05D 1/0246 |
| 2020/0365027 A1* | 11/2020 | Noguchi | ................ | G08G 1/142 |

FOREIGN PATENT DOCUMENTS

| | | | |
|---|---|---|---|
| JP | 2017185954 A | * | 10/2017 |
| JP | 2018-151858 A | | 9/2018 |

\* cited by examiner

VEHICLE CONTROLLING DEVICE AND COMPUTER READABLE RECORDING MEDIUM

CROSS-REFERENCE TO RELATED APPLICATIONS

The present application claims priority from Japanese Patent Application No. 2018-184260 filed on Sep. 28, 2018, the entire contents of which are hereby incorporated by reference.

BACKGROUND

The technology relates, for example, to a vehicle controller and a computer readable recording medium for controlling a vehicle.

An automated valet parking system is being developed as one example of systems that assist parking vehicles. The automated valet parking system automates valet parking by utilizing automatic driving technology for vehicles. The automated valet parking system is constructed under the assumption that a coordinating device of the automated valet parking system disposed in a valet parking facility, such as a hotel or a large-scale commercial establishment, plays a main role in coordinating vehicles. For example, after a user or an occupant (including a driver) stops a vehicle in a predetermined drop-off area and gets off the vehicle, the automated valet parking system can move the vehicle to a required parking lot (parking space) to park the vehicle through automatic driving. Upon a predetermined condition being satisfied, such as upon a call from the user, the coordinating device issues an instruction to the vehicle and causes the vehicle to move from the parking lot to a predetermined pick-up area to pick up the user through automatic driving.

In the automated valet parking system, a plurality of vehicles is allowed to stop in a pick-up area at the same time. This configuration eases the congestion of vehicles heading to the pick-up area from a parking lot.

Reference may be made to Japanese Patent No. 4457865 and Japanese Unexamined Patent Application Publication No. 2017-185954, for example.

SUMMARY

An aspect of the technology provides a vehicle controller that includes a first estimator, a second estimator, and a first controller. The first estimator is configured to obtain first estimation information with regard to a target vehicle that stops in a pick-up area where a plurality of vehicles is allowed to to stop waiting for a user to get therein. The user is an occupant of corresponding one of the vehicles. The first estimation information indicates whether the user of the target vehicle is carrying a large piece of luggage having a size equal to or greater than a predetermined size. The second estimator is configured to obtain second estimation information indicating an other-vehicle stopping status. The other-vehicle stopping status indicates a status of another vehicle stopping around the target vehicle. The first controller is configured to cause the other vehicle to move on a basis of the first estimation information obtained by the first estimator and the second estimation information obtained by the second estimator.

An aspect of the technology provides a non-transitory computer readable recording medium including a program that causes an information processor to implement a method. The method includes: obtaining first estimation information with regard to a target vehicle that stops in a pick-up area where a plurality of vehicles is allowed to stop waiting for a user to get therein, in which the user is an occupant of corresponding one of the vehicles, and the first estimation information indicates whether the user of the target vehicle is carrying a large piece of luggage having a size equal to or greater than a predetermined size; obtaining second estimation information indicating an other-vehicle stopping status, in which the other-vehicle stopping status indicates a status of another vehicle stopping around the target vehicle; and causing the other vehicle to move on a basis of the first estimation information obtained and the second estimation information obtained.

An aspect of the technology provides a vehicle controller that includes circuitry configured to: obtain first estimation information with regard to a target vehicle that stops in a pick-up area where a plurality of vehicles is allowed to stop waiting for a user to get therein, in which the user is an occupant of corresponding one of the vehicles, the first estimation information indicates whether the user of the target vehicle is carrying a large piece of luggage having a size equal to or greater than a predetermined size; obtain second estimation information indicating an other-vehicle stopping status, in which the other-vehicle stopping status indicates a status of another vehicle stopping around the target vehicle; and causing the other vehicle to move on a basis of the first estimation information obtained and the second estimation information obtained.

BRIEF DESCRIPTION OF THE DRAWINGS

The accompanying drawings are included to provide a further understanding of the technology and are incorporated in and constitute a part of this specification. The drawings illustrate example embodiment and, together with the specification, serve to explain the principles of the technology.

DETAILED DESCRIPTION

A user sometimes arrives at a pick-up area of an automated valet parking system carries a large piece of luggage after shopping, for example. In this case, it is conceivable that the user would load the large piece of luggage into his/her vehicle that is waiting in the pick-up area.

In consideration of such a situation where a large piece of luggage is loaded into a vehicle, it is conceivable to secure a somewhat large parking space for each vehicle in the pick-up area.

However, it is not always the case that every user carries a large piece of luggage, and securing a large parking space for a vehicle of which a user is not carrying a large piece of luggage may be inefficient in terms of effective use of the limited space in the pick-up area.

It is desirable to increase the number of vehicles that are allowed to stop in a pick-up area while ensuring the ease of loading a large piece of luggage into a vehicle.

1. Configuration of Pick-Up System

Hereinafter, a vehicle controller according to an example embodiment of the technology is described with reference to the appended drawings.

Figure 1:
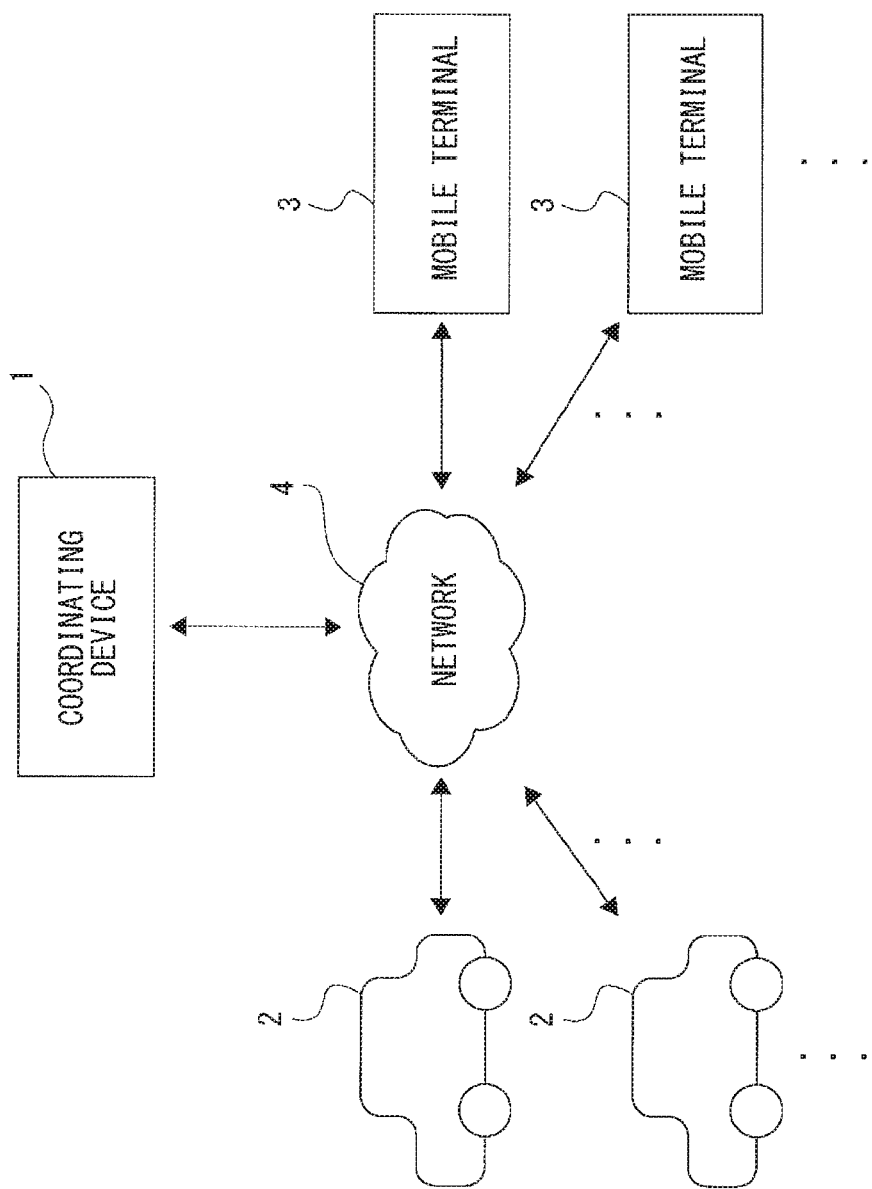
FIG. 1 illustrates an example of a configuration of a pick-up system according to one example embodiment.
Figure 2:
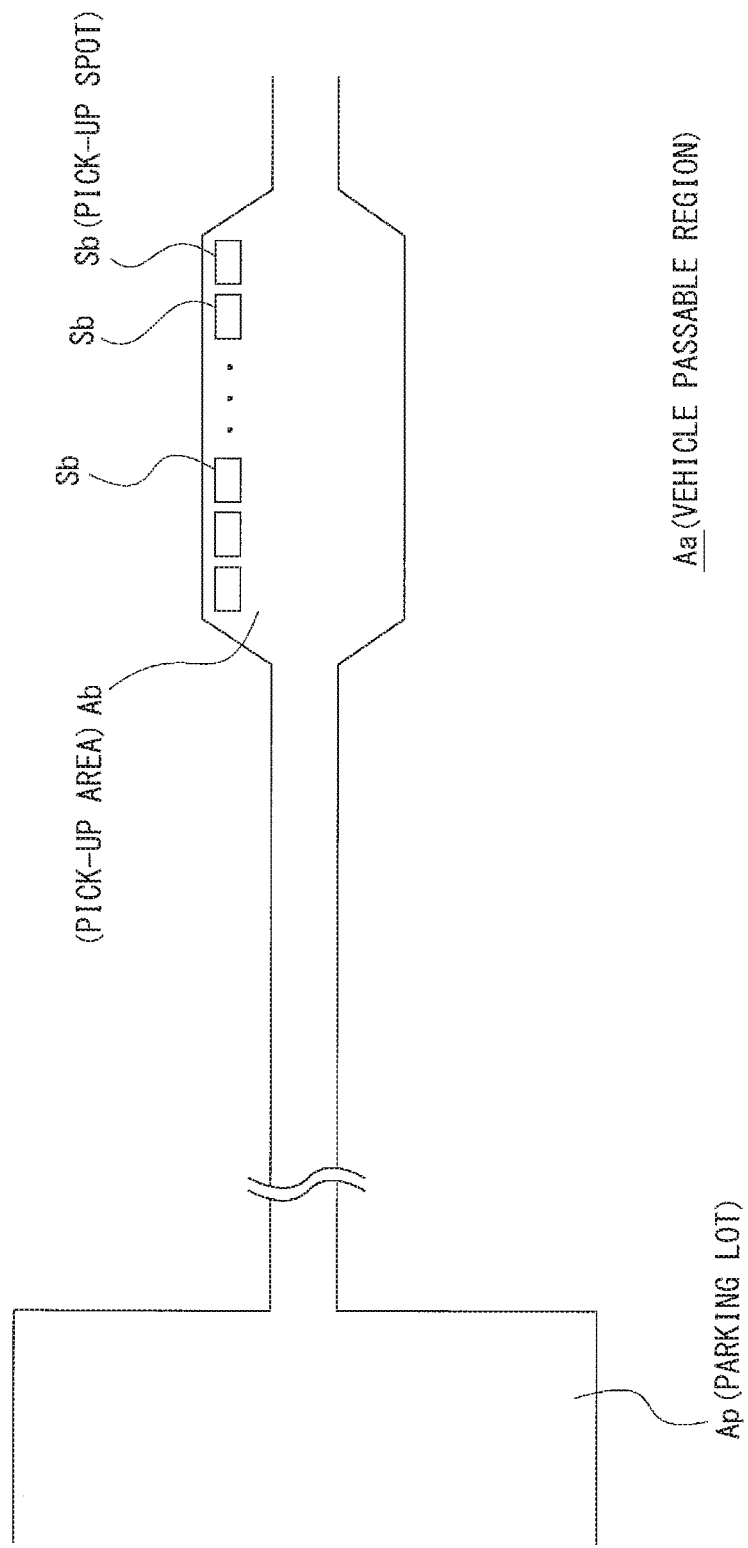
FIG. 2 is a schematic diagram illustrating an example of a vehicle passable region defined in a valet parking facility to which a pick-up system according to one example embodiment is applied.

FIG. 1 illustrates an example of a configuration of a pick-up system that includes a vehicle controller according to an example embodiment (hereinafter referred to as a "pick-up system according to the example embodiment"). FIG. 2 is a schematic diagram illustrating an example of a vehicle passable region Aa defined in a valet parking facility to which the pick-up system according to the example embodiment is applied.

As illustrated in FIG. 1, the pick-up system according to the example embodiment may include a coordinating device 1, a plurality of vehicles 2, a plurality of mobile terminals 3, and a network 4. The network 4 may be, for example, a communication network, such as the Internet or a local area network (LAN). The coordinating device 1 may be able to communicate with each of the vehicles 2 and with each of the mobile terminals 3 via the network 4. In this example, the vehicles 2 and the mobile terminals 3 may also be able to communicate with each other via the network 4.

The coordinating device 1 may be a computer controlled at a valet parking facility. The vehicles 2 may each be used by a user using the valet parking facility. The mobile terminals 3 may each be used by the user.

As illustrated in FIG. 2, the vehicle passable region Aa in the valet parking facility may include a parking lot Ap and a pick-up area. The parking lot Ap and the pick-up area Ab may be coupled by a passage that allows each vehicle 2 to pass therethrough. Thus, the vehicle 2 may be able to move between the parking lot Ap and the pick-up area Ab.

Although not illustrated, the parking lot Ap may be provided with a plurality of parking spots, and thus allows a plurality of vehicles 2 to park therein. The pick-up area Ab may serve as a place where an occupant gets into the vehicle 2. In this example, a plurality of vehicles 2 is allowed to be parked in parallel in the pick-up area Ab. In other words, a plurality of vehicles 2 is allowed to be arrayed in the front-back direction in the pick-up area Ab. As illustrated in FIG. 2, the pick-up area Ab may include a plurality of pick-up spots Sb. Each of the pick-up spots Sb may define a frame in which the vehicle 2 is to stop waiting for the user or occupant of the vehicle 2. As illustrated in FIG. 2, for example, the pick-up spot Sb may be defined by, for example but not limited to, a white line.

A gate having an operable bar, for example, may be provided at an entrance of the pick-up area Ab through which the vehicle 2 coming from the parking lot Ap enters the pick-up area Ab.

In the automated valet parking system implemented in this example, the vehicle 2 may be able to perform automatic driving. The occupant of the vehicle 2 may drive the vehicle 2 through manual driving or automatic driving to a predetermined drop-off area provided in a valet parking facility. After the user or occupant (including the driver) arrives at the drop-off area and gets off the vehicle 2, the vehicle 2 may automatically move and park itself in the parking lot Ap in response to, for example, a parking instruction from the user. For example, the parking instruction may be issued in response to an input on the vehicle 2 or an instruction on the vehicle 2 via the mobile terminal 3.

At this point, the coordinating device 1 may manage information on an available parking spot in the parking lot Ap. The coordinating device 1 may instruct the vehicle 2 to move from the drop-off area to the parking lot Ap as described above and to park itself in the available parking spot. For example, a parking spot identifier, such as a parking spot number, may be assigned to each parking spot in such a manner that allows the vehicle 2 to identify the parking spot. The coordinating device 1 may manage the availability of each parking spot using such an identifier. Upon receiving the parking spot identifier of an available parking spot from the coordinating device 1, the vehicle 2 may be automatically parked into the parking spot specified by the parking spot identifier received.

In the automated valet parking system of this example, the user may be allowed to instruct the coordinating device 1 to call the user's vehicle 2 parked in the parking lot Ap by operating the mobile terminal 3. For example, the user may be able to instruct the coordinating device 1 to call the user's vehicle 2 into the pick-up area Ab.

Upon receiving this calling instruction, the coordinating device 1 may instruct the corresponding vehicle 2 to move to the pick-up area Ab to pick up the user in the pick-up area Ab. At this point, the coordinating device 1 may manage the availability of each pick-up spot Sb in the pick-up area Ab and guide the called vehicle 2 to the pick-up spot Sb that is available. This available spot may be hereinafter also referred to as an "available pick-up spot".

In the pick-up system according to the example embodiment, the number of the vehicles 2 and the number of the mobile terminals 3 may be changed depending on the number of the users of the system. In some cases, the number of the vehicles 2 and the number of the mobile terminals 3 and may each be one.

2. Configuration of Each Device

Figure 3:
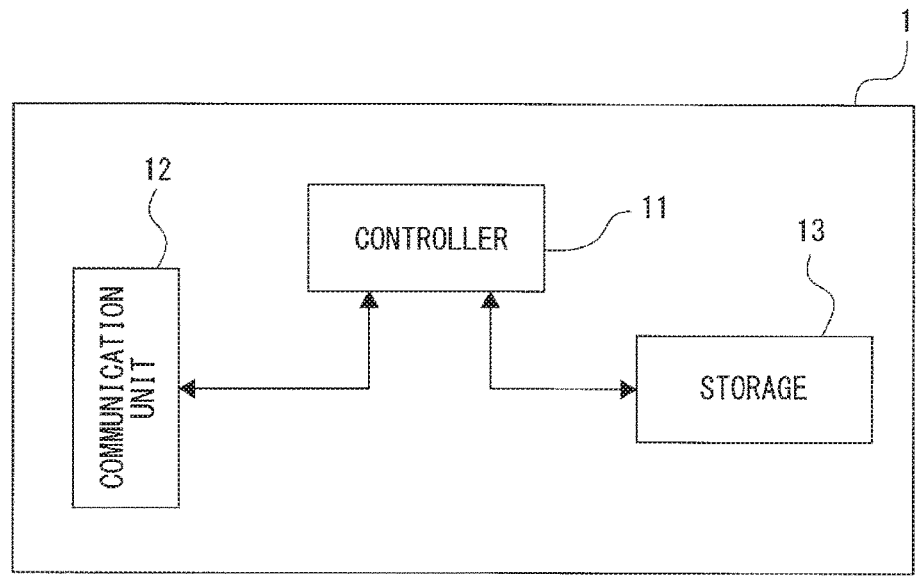
FIG. 3 is a block diagram illustrating an example of an inner configuration of a coordinating device according to one example embodiment.

FIG. 3 is a block diagram illustrating an example of an inner configuration of the coordinating device 1.

As illustrated in FIG. 3, the coordinating device 1 may include a controller 11, a communication unit 12, and a storage 13. The controller 11 may include, for example, a microcomputer including a central processing unit (CPU), a read-only memory (ROM), and a random-access memory (RAM). A necessary operation of the coordinating device 1 may be implemented as the CPU executes a process that is based on a program held in the ROM.

The communication unit 12 may transmit and/or receive data to and/or from an external device via the network 4 in accordance with an instruction from the controller 11. Specific but non-limiting examples of the external device may include the vehicles 2 and the mobile terminals 3 in the example embodiment. The controller 11 may establish data communication with the external device via the communication unit 12. The communication unit 12 and the network 4 may be coupled to each other via wired or wireless connection.

The storage 13 may include, for example, a storage, such as a flash memory or a hard disk drive (HDD). The storage 13 may be caused by the controller 11 to store various pieces of data therein. The storage 13 may be able to hold various pieces of data necessary for coordinating the vehicles 2. Examples of the data held in the storage may include data on an available parking spot in the parking lot Ap and data on an available pick-up spot.

Figure 4:
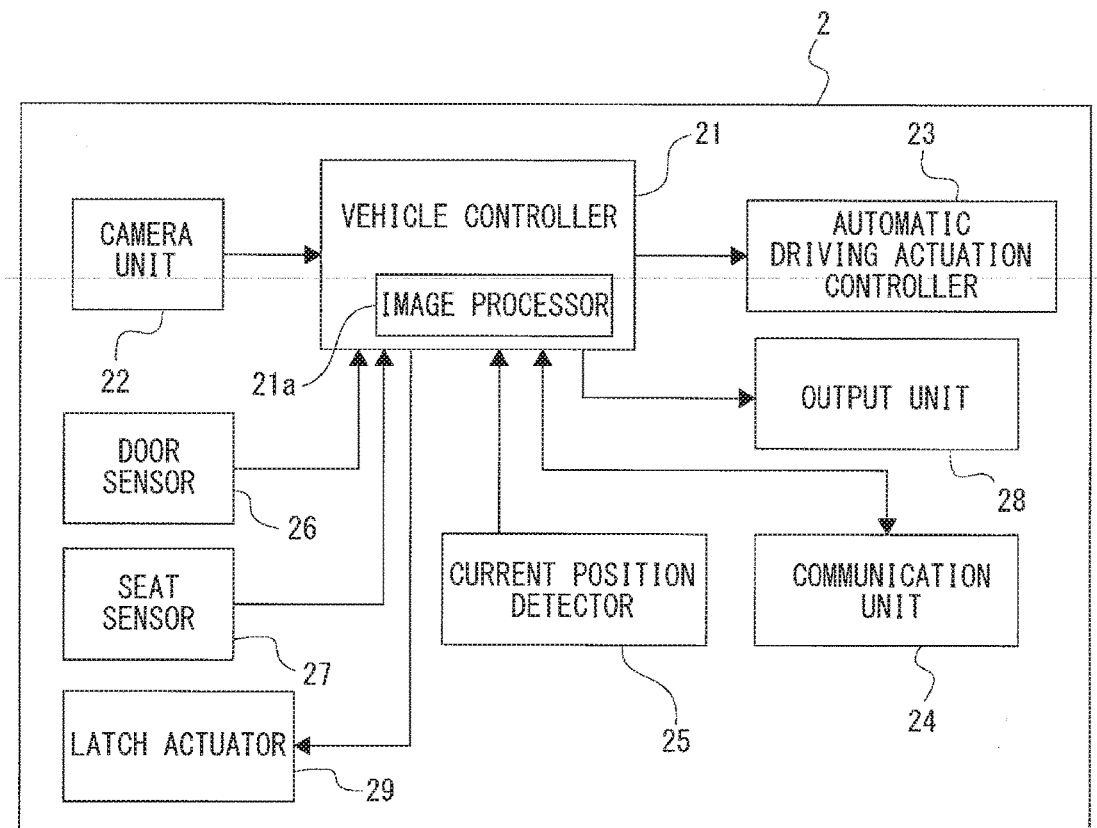
FIG. 4 is a block diagram schematically illustrating an example of an electrical configuration included in a vehicle according to one example embodiment.

FIG. 4 is a block diagram schematically illustrating an example of an electrical configuration included in the vehicle 2.

The vehicle 2 of this example may include a vehicle controller 21, a camera unit 22, an automatic driving actuation controller 23, a communication unit 24, a current position detector 25, a door sensor 26, a seat sensor 27, an output unit 28, and a latch actuator 29.

The vehicle controller 21 may include a microcomputer including a CPU and a memory (i.e., a storage), such as a ROM or a RAM. The vehicle controller 21 may control each unit of the vehicle 2.

For example, the vehicle controller 21 may perform control for achieving the automatic driving. The term "automatic driving" as used herein may refer to at least moving to a specified position, such as the drop-off area, the parking lot Ap, and the pick-up area Ab (i.e., the pick-up spot Sb), moving in a specified direction by a specified amount, and automatic parking of a vehicle in a parking spot in the parking lot Ap. Moving to a specified position may include moving between the drop-off area, the parking lot Ap, and the pick-up area Ab (i.e., the pick-up spot Sb).

The vehicle controller 21 may be able to acquire current position information using the current position detector 25 (e.g., a global navigation satellite system (GNSS) sensor) that detects the current position of the vehicle 2. In addition, map information may be stored in an internal memory, such as the ROM described above. The vehicle controller 21 may perform various control operations for achieving the automatic driving on the basis of the current position information, the map information, and an image picked up by one or more cameras included in the camera unit 22. The camera(s) included in the camera unit 22 may capture an image in a direction away from the vehicle 2. The vehicle controller 21 may include an image processor 21a that analyzes the image captured by the camera(s) included in the camera unit 22 (hereinafter simply referred to as a "camera image"). Thus, the vehicle controller 21 may recognize an environment outside the vehicle 2. For example, the vehicle controller 21 may detect an object present outside the vehicle 2 and identify the detected object to recognize the environment outside the vehicle 2. Thereafter, the vehicle controller 21 may issue various instructions to the automatic driving actuation controller 23 on the basis of the result of recognition on the environment outside the vehicle 2, the current position information, and the map information described above. The vehicle controller 21 may thereby achieve the automatic driving.

The automatic driving actuation controller 23 may inclusively represent a steering control electronic control unit (ECU) that controls actuation of a steering actuator, a vehicle propulsion control ECU that controls actuation of a vehicle propulsion device-related actuator, a brake control ECU that controls actuation of a brake-related actuator, and a transmission control ECU that controls actuation of a transmission-related actuator. Example of the steering actuator may include a power steering motor and another actuator that are able to change the steering angle. Examples of the brake-related actuator may include a hydraulic control actuator that controls the fluid pressure output from the brake booster to the master cylinder or the fluid pressure within the brake fluid pipe. The transmission-related actuator may be provided for shifting gears or switching between forward driving and reverse driving.

In a case where the vehicle 2 is an engine-powered vehicle, the vehicle propulsion device-related actuator may be, for example, a throttle actuator that actuates a throttle valve or various actuators related to actuating the engine, such as an injector that performs fuel injection. In a case where the vehicle 2 is an electric-powered vehicle, the vehicle propulsion device-related actuator may be, for example but not limited to, a motor for traveling.

On the basis of the result of recognition of the environment outside the vehicle 2, the current position information of the vehicle 2, and the map information described above, the vehicle controller 21 may issue, to the automatic driving actuation controller 23, an instruction on, for example but not limited to, the steering amount, an instruction related to the vehicle propulsion, such as the accelerator position, an instruction on the engagement/disengagement of the brake, and an instruction on the forward/reverse driving of the vehicle 2. The vehicle controller 21 may thereby achieve the automatic driving. Specific techniques for the automatic driving control are not directly related to the technology and are thus not described in detail.

The vehicle controller 21 may be coupled to the communication unit 24. The communication unit 24 may transmit and/or receive data to and/or from an external device via the network 4. Specific but non-limiting examples of the external device may include the coordinating device 1 and the mobile terminals 3 in the example embodiment. The vehicle controller 21 may establish data communication with the external device via the communication unit 24.

In this example, the communication unit 24 and the network 4 may be coupled to each other via wireless connection. In another example, the communication unit 24 and the network 4 may be coupled to each other via wired connection.

The vehicle controller 21 may be coupled to the door sensor 26 and the seat sensor 27.

The door sensor 26 may inclusively represent devices that perform sensing related to each door provided in the vehicle 2. The door sensor 26 in this example may be configured to be able to detect at least the open/closed state of each door. In this example, doors subjected to the detection may include a door used by an occupant to get in or get out of the vehicle 2 and a trunk door (i.e., a door that separates the trunk from the outside of the vehicle 2).

The seat sensor 27 may inclusively represent devices that perform sensing related to each seat, such as a driver seat or a passenger seat, provided in the vehicle 2. The seat sensor 27 in this example may be configured to be able to determine at least a presence of an occupant sitting on a seat.

The presence of an occupant sitting on a seat may be determined on the basis of the result of analyzing the image captured by a camera that configured to capture an image of the inside of the vehicle compartment.

The vehicle controller 21 may be coupled to the output unit 28. The output unit 28 may inclusively represent devices that output audio information and/or visual information provided in the form of, for example but not limited to, light. The output unit 28 may include, for example, a speaker, an image display device such as a light-emitting element or a liquid-crystal display, and a driving unit for the speaker and the image display device. The vehicle controller 21 may be able to cause predetermined information to be output to the inside and/or the outside of the vehicle 2 by controlling the output unit 28.

The vehicle 2 may be provided with the latch actuator 29.

Although not illustrated, the vehicle 2 in this example may be provided with a latch mechanism that is able to switch a backrest portion of a backseat (i.e., a seat adjacent to the trunk) between a forward-foldable state and a forward-unfoldable state. While the latch mechanism is in a latch engaged state, the backrest portion may be in the forward-foldable state. While the latch mechanism is in a latch disengaged state, the backrest portion may be in the forward-unfoldable state.

The latch actuator 29 may be configured to switch this latch mechanism between the latch engaged state and the latch disengaged state.

The vehicle controller 21 of this example may also control the latch actuator 29, which will be described later.

In one embodiment of the technology, the vehicle controller 21 provided in the vehicle 2 may correspond to a "vehicle controller". Various processes performed by the vehicle controller 21 according to one example embodiment of the technology will be described later.

Figure 5:
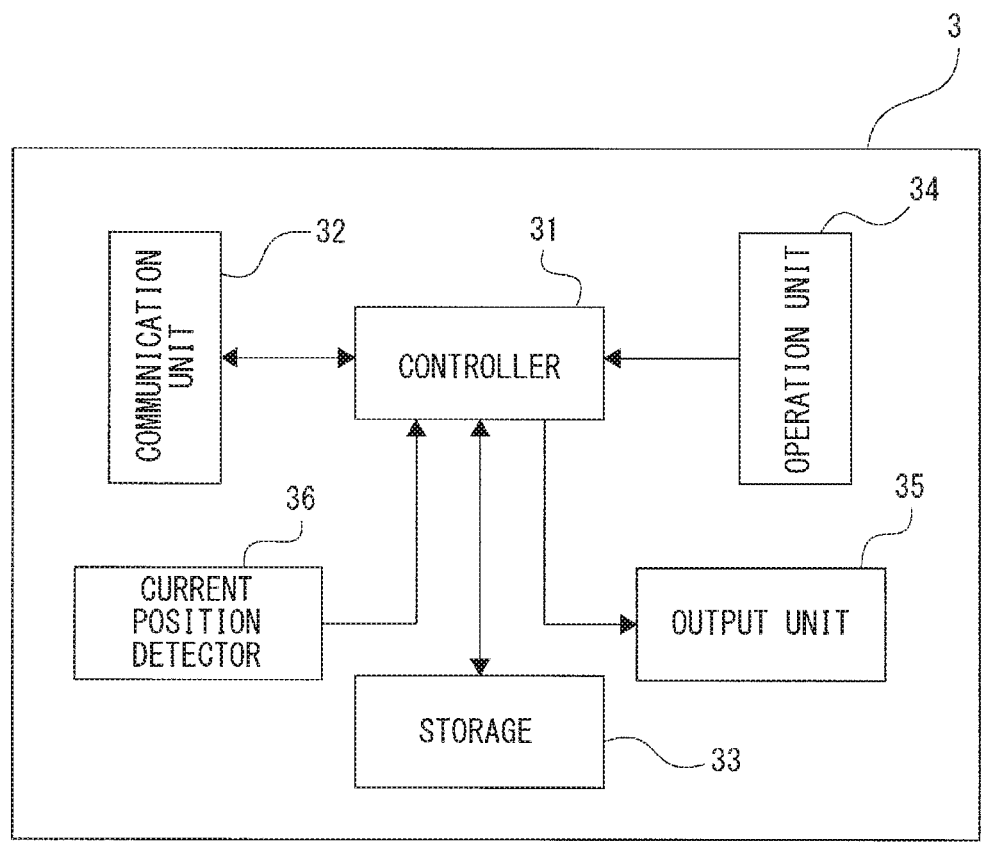
FIG. 5 is a block diagram illustrating an example of an inner configuration of a mobile terminal according to one example embodiment.

FIG. 5 is a block diagram illustrating an example of an inner configuration of the mobile terminal 3.

The mobile terminal 3 may be, for example, a mobile information processing terminal, such as a mobile phone (e.g., a smartphone) or a tablet terminal.

The mobile terminal 3 may include a controller 31, a communication unit 32, a storage 33, an operation unit 34, an output unit 35, and a current position detector 36.

The controller 31 may include, for example, a microcomputer including a CPU, a ROM, and a RAM. A necessary operation of the mobile terminal 3 may be implemented as the CPU executes a process that is based on a program held in the ROM.

The communication unit 32 may transmit and/or receive data to and/or from an external device via the network 4 in accordance with an instruction from the controller 31. Specific but non-limiting examples of the external device may include the coordinating device 1 and the vehicles 2 in the example embodiment. The controller 31 may establish data communication with the external device via the communication unit 32.

In this example, the communication unit 32 and the network 4 may be coupled to each other via wireless connection. In another example, the communication unit 32 and the network 4 may be coupled to each other via wired connection.

The storage 33 may include, for example, a storage, such as a flash memory or a hard disk drive (HDD). The storage 33 may be caused by the controller 31 to store various pieces of data.

The operation unit 34 may include various operators provided in the mobile terminal 3. The operation unit 34 may output, to the controller 31, operation information corresponding to an operation. Examples of the operators in the operation unit 34 may include various keys and a touch panel.

The output unit 35 may inclusively represent devices provided in the mobile terminal 3 for outputting various pieces of information to the user. Examples of such devices may include a speaker and various display devices, such as a liquid-crystal display or an organic electro-luminescence (EL) display.

The output unit 35 may output various pieces of information in accordance with an instruction from the controller 31. For example, the output unit 35 may display such information on a screen or in the form of an audio output.

The current position detector 36 may include, for example, a GNSS sensor and detect a current position of the mobile terminal 3. The controller 31 may be able to acquire current position information detected by the current position detector 36.

The mobile terminal 3 of this example may include a storage 33 that is readable by the controller 31. The storage 33 may hold an app (i.e., an application program) for the pick-up system, for example.

This app for the pick-up system may provide the user with a calling operation screen for calling the vehicle 2.

In this example, to call the user's vehicle 2 parked in the parking lot Ap to the pick-up area Ab, the user may start the app for the pick-up system and perform a predetermined operation on the calling operation screen provided by the app.

Although not illustrated, a payment (i.e., settling) for a purchase with electronic money may be performed by the mobile terminal 3 of this example. As the payment for a purchase is made with electronic money by the mobile terminal 3, the controller 31 may be able to transmit information indicating the paid purchase price (i.e., the monetary amount paid for the purchase) to the vehicle 2 (i.e., the vehicle controller 21) via the communication unit 32.

A process performed in the vehicle 2 on the basis of such information on the monetary amount paid for the purchase will be described later.

3. Method of Identifying Vehicle Called

In the pick-up system according to the example embodiment, in a case where the coordinating device 1 has received a call from the user (i.e., the mobile terminal 3), the coordinating device 1 may identify, out of the vehicles 2 parked in the parking lot Ap, the vehicle 2 of the user who has made the call and instruct the identified vehicle 2 to move to the pick-up area Ab.

To achieve this, the coordinating device 1 (i.e., the controller 11) may need to obtain the correspondence relationship between the user and the vehicle 2. Various techniques for obtaining the correspondence relationship may be conceivable, and there is no particular limitation on a specific technique. One example of the techniques will be described below.

First, upon arriving at the drop-off area, the vehicle 2 (i.e., the vehicle controller 21) may notify the coordinating device 1 of the arrival. At this point, the vehicle 2 may notify the coordinating device 1 of predetermined vehicle information, such as the vehicle identification number of the vehicle 2, that allows the coordinating device 1 to uniquely identify the vehicle 2. This predetermined vehicle information may be hereinafter referred as "vehicle identification information". With this notification, the coordinating device 1 may be able to obtain the vehicle identification information of each vehicle 2 that has moved from the drop-off area and parked in a parking spot in the parking lot Ap.

The user may set the vehicle identification information of the user's vehicle 2 into the app for the pick-up system described above as, for example but not limited to, an initial setting of this app. Thereafter, when calling the vehicle 2, the app for the pick-up system may transmit, to the coordinating device 1, the set vehicle identification information along with information of the calling instruction.

Thus, upon calling for the vehicle 2, the coordinating device 1 may be able to identify, on the basis of the vehicle identification information, the vehicle 2 called.

4. Vehicle Controlling Method of Example Embodiment

Figure 6:
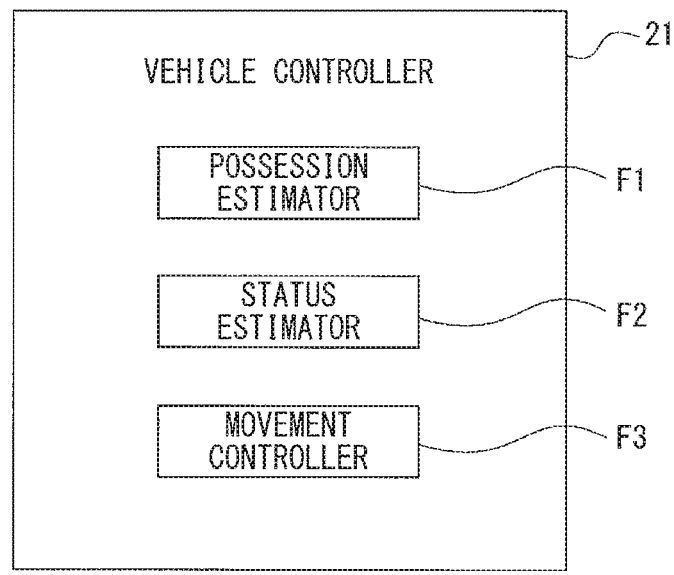
FIG. 6 is a block diagram illustrating example of operations included in a vehicle controller according to one example embodiment.

FIG. 6 is a block diagram illustrating an example of the vehicle controller 21.

As illustrated in FIG. 6, the vehicle controller 21 includes a possession estimator F1, a status estimator F2, and a movement controller F3.

The possession estimator F1 may obtain estimation information as to whether the user of a target vehicle that stops in the pick-up area Ab carries a large piece of luggage having a size equal to or greater than a predetermined size.

The term "target vehicle" as used herein may refer to a host vehicle in which the vehicle controller 21 is provided. Conceivable examples of the large piece of luggage may include an elongated object, such as a ski, a snowboard, or a laundry pole.

A specific but non-limiting example of a technique for estimating whether a user is carrying a large piece of luggage will be described later.

The status estimator F2 may obtain estimation information on an other-vehicle stopping status that indicates a status of another vehicle stopping around the target vehicle. The other vehicle stopping status may be a concept that includes at least the presence of another vehicle around the target vehicle and the positional relationship of the other vehicle with respect to the target vehicle. Estimating such an other-vehicle stopping status may make it possible to estimate the size of an available space around the target vehicle. For example, an estimation may be made in terms of the possibility of securing a space, around the target vehicle, for loading a large piece of luggage into the target vehicle.

The movement controller F3 may cause another vehicle to move on the basis of the estimation information obtained by the possession estimator F1 and the estimation information obtained by the status estimator F2. In a case where it is estimated that the user is carrying a large piece of luggage and is going to load the luggage into the target vehicle and that a space for loading is not able to be secured around the target vehicle, the movement controller F3 may move another vehicle to secure the space for loading.

Hereinafter, a specific but non-limiting example of a process executed by the vehicle controller 21 in order to achieve the vehicle controlling method according to the example embodiment described above is described with reference to the flowchart illustrated in FIG. 7.

Figure 7:
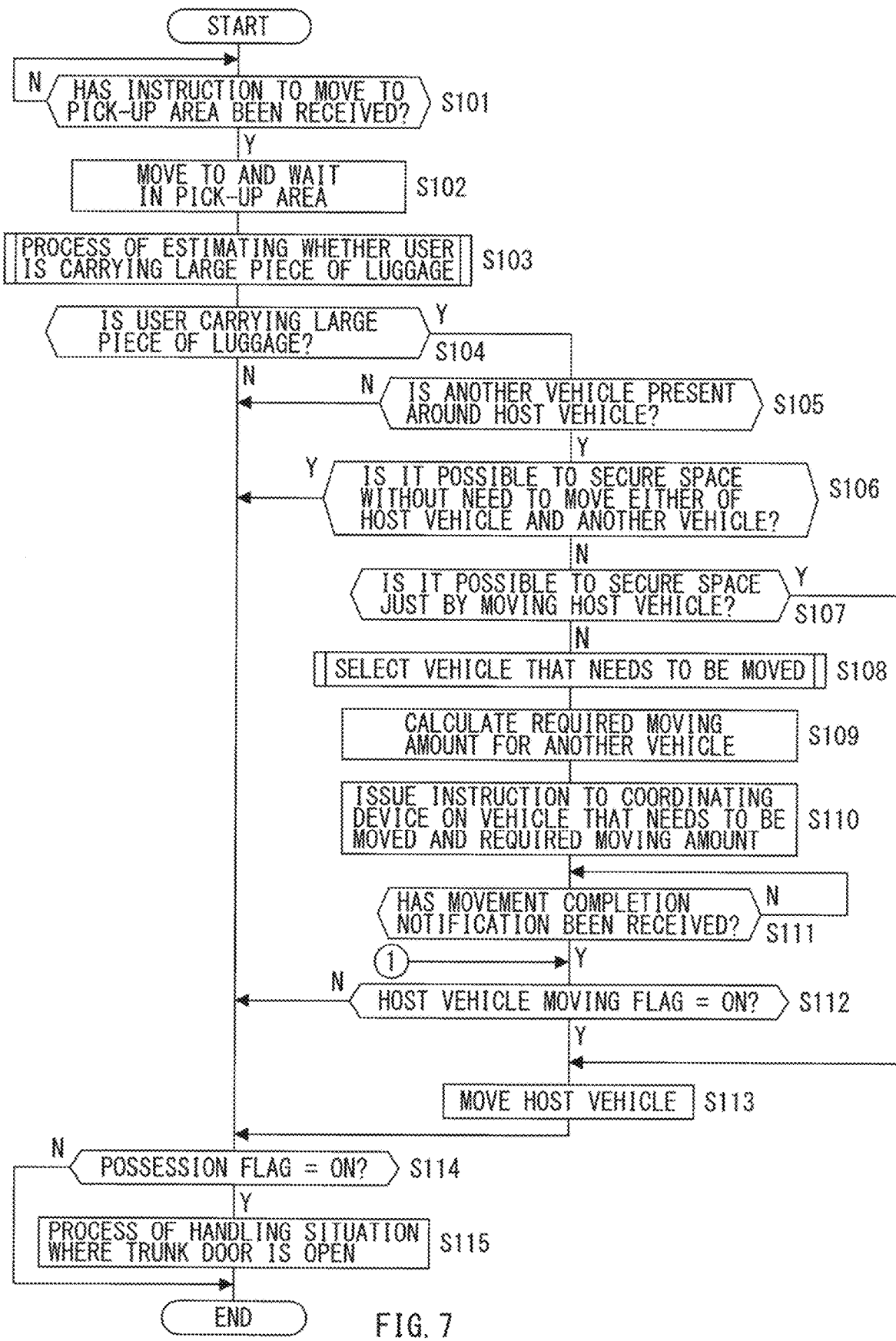
FIG. 7 is a flowchart illustrating an example of a process for implementing a vehicle controlling method according to one example embodiment.

The process illustrated in FIG. 7 may be executed by the vehicle controller 21 (i.e., the CPU) on the basis of a program held in the ROM, for example. In this example, the process illustrated in FIG. 7 may be started upon parking of the vehicle 2 in the parking lot Ap.

First, in step S101, the vehicle controller 21 may stand by for an instruction to move to the pick-up area Ab. In other words, the vehicle controller 21 may stand by for an instruction to move from the parking lot Ap to the pick-up area Ab. This instruction may be issued by the coordinating device 1 to the vehicle 2 in response to a call from the user.

In a case where the vehicle controller 21 does not receive an instruction to move (N in step S101), the vehicle controller 21 may again execute the process in step S101. Thus, the process in step S101 may be repeated until the vehicle controller 21 receives an instruction to move. In a case where the vehicle controller 21 receives an instruction to move (Y in step S101), the procedure may proceed to step S102. In step S102, the vehicle controller 21 may perform a process of moving to and waiting in the pick-up area Ab. In other words, the vehicle controller 21 may cause the vehicle 2 to move to the pick-up area Ab through the automatic driving described above and stop the vehicle 2 in a predetermined pick-up spot Sb in the pick-up area Ab. In this example, the vehicle controller 21 may stop the vehicle 2 in a pick-up spot Sb specified by the coordinating device 1.

After the execution of the process in step S102, the vehicle controller 21 may execute, in step S103, a process of estimating whether the user is carrying a large piece of luggage.

Figure 8:
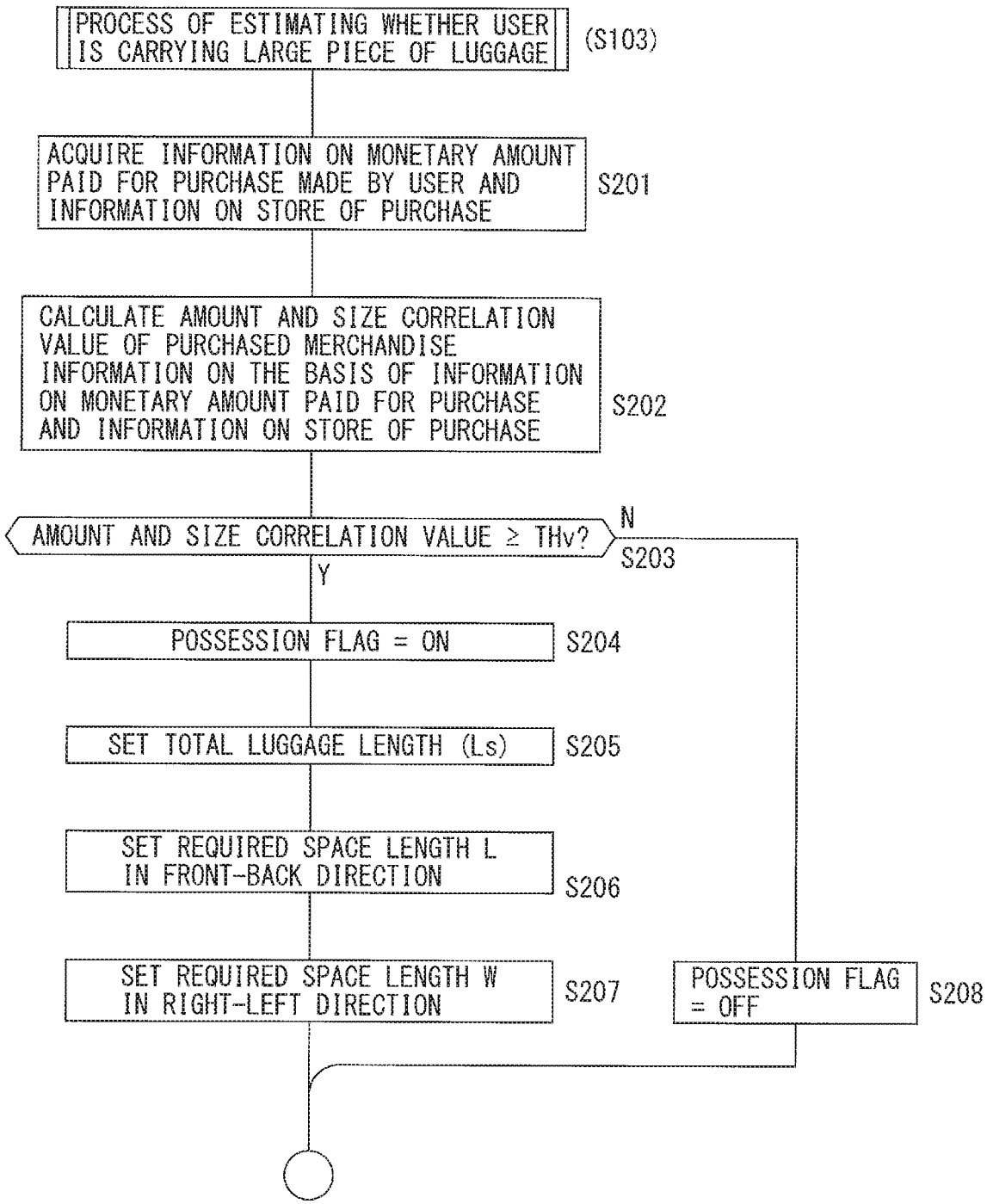
FIG. 8 is a flowchart illustrating an example of a process of estimating whether a user is carrying a large piece of luggage according to one example embodiment.

FIG. 8 is a flowchart illustrating an example of the process, in step S103, of estimating whether the user is carrying a large piece of luggage.

In this example, whether the user is carrying a large piece of luggage may be estimated on the basis of information on merchandise purchased by the user (hereinafter referred to as user's purchased merchandise information). This user's purchased merchandise information may be obtained as the user purchases merchandise with an electronic money using the mobile terminal 3.

In this example, on the basis of the user's purchased merchandise information, the vehicle controller 21 may calculate a correlation value between an amount and a size (hereinafter referred to as an amount-size correlation value) for estimating the amount and the size of the luggage to be carried by the user. On the basis of this amount-size correlation value, the vehicle controller 21 may estimate whether the user is carrying a large piece of luggage.

For example, in a case where a payment has been made with electronic money, the mobile terminal 3 may transmit information on the paid monetary amount to the vehicle 2 (i.e., the vehicle controller 21).

The vehicle controller 21 may estimate the type of the store where the user has purchased the merchandise by acquiring the position information of the mobile terminal 3 held by the user who has purchased the merchandise (i.e., the user who has made the payment with electronic money). The vehicle controller 21 may hold, as the user's purchased merchandise information, information on the type of the store where the user has purchased the merchandise and the monetary amount paid in that store (i.e., the monetary amount paid for the purchase) and calculate the amount-size correlation value on the basis of the user's purchased merchandise information. This amount-size correlation value may be calculated basically as follows. The amount-size correlation value may be greater in a case where the user has purchased merchandise at a store that sells large-sized merchandise, and the amount-size correlation value may be smaller in a case where the user has purchased merchandise at a store that sells small-sized merchandise. In addition, the amount-size correlation value may be so calculated as to take a greater value as the monetary amount paid for the purchase is greater.

Through processes in steps S201 and S202 illustrated in FIG. 8, the vehicle controller 21 may execute the process of calculating the amount-size correlation value described above.

In a specific but non-limiting example, the vehicle controller 21 may first acquire, in step S201, information on the monetary amount paid for purchase made by the user and information on the store of purchase. In other words, the vehicle controller 21 may acquire, from the user's purchased merchandise information stored as described above, the information on the store of purchase, which is information on the type of the store where the user has purchased the merchandise, and the information on the monetary amount paid for purchase, which is information on the monetary amount paid at that store. The information on the store of purchase and the information on the monetary amount paid for purchase may cover information on a new purchase made during a period in which the user is currently using the valet parking. In a specific but non-limiting example, the information on a new purchase may cover a period from when the last instruction to move to the parking lot Ap has been made to the current time may be acquired.

Thereafter, in step S202, the vehicle controller 21 may calculate the amount-size correlation value through the technique described above on the basis of the information on the monetary amount paid for purchase and the information on the store of purchase.

In step S203 following step S202, the vehicle controller 21 may determine whether the amount-size correlation value is equal to or greater than a threshold value THv. This determination process in step S203 may serve as a process of estimating whether the user is carrying a large piece of luggage.

In a case where the vehicle controller 21 determines, in step S203, that the amount-size correlation value is equal to or greater than the threshold value THv (Y in step S203), the procedure may proceed to step S204. In step S204, the vehicle controller 21 may perform a process of setting a possession flag fh to ON. This possession flag fh may be used for identifying whether the user is carrying a large piece of luggage. The possession flag fh being ON (fh=ON) may indicate that the user is carrying a large piece of luggage. The possession flag fh may be referred to in a determination process in steps S104 and S114 (FIG. 7) described later.

In contrast, in a case where the vehicle controller 21 determines, in step S203, that the amount-size correlation value is smaller than the threshold value THv (N in step S203), the vehicle controller 21 may set, in step S208, the possession flag fh to OFF (fh=OFF), and the process, illustrated in FIG. 8, of estimating whether the user is carrying a large piece of luggage may be terminated. In other words, in a case where the amount-size correlation value is smaller than the threshold value THv and where it is estimated that the user is not carrying a large piece of luggage, the possession flag fh may remain in its initial value (i.e., OFF) and may not be updated.

In response to the possession flag fh having been set to ON in step S204, the vehicle controller 21 may set various parameters related to a space required for loading a large piece of luggage through processes in step S205 and the subsequent steps.

In a specific but non-limiting example, the vehicle controller 21 may perform a process of setting a total luggage length Ls in step S205, a process of setting a required space length L in the front-back direction in step S206, and a process of setting a required space length W in the right-left direction in step S207.

In this example, in step S205, the total luggage length Ls may be set to a fixed value. The fixed value may be in a range of from about 1.5 m to about 2 m, for example.

Figure 9:
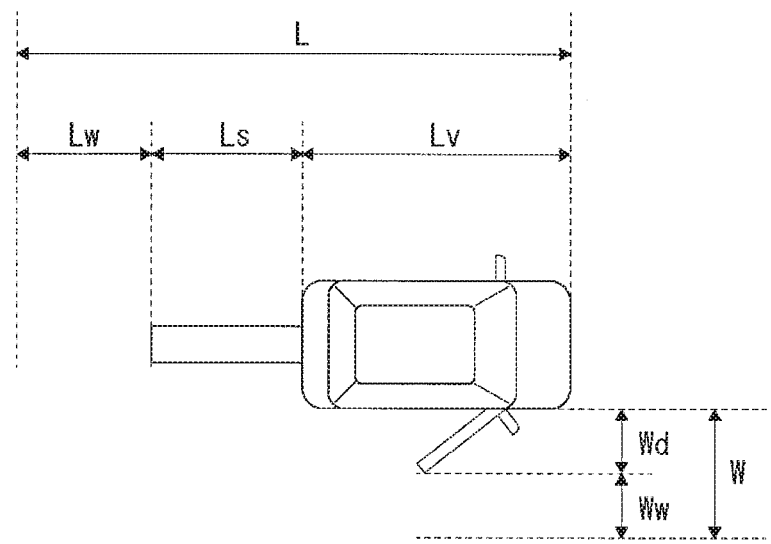
FIG. 9 is an illustration for describing a required space length in a front-back direction and a required space length in a right-left direction.

FIG. 9 illustrates the required space length L in the front-back direction and the required space length W in the right-left direction.

As illustrated in FIG. 9, the required space length L in the front-back direction may be a total value of a total vehicle length Lv, the total luggage length Ls, and a work-space length Lw in the front-back direction. In this example, the work-space length Lw in the front-back direction may be set to a fixed value, which may be 1 m, for example. This work-space length Lw in the front-back direction may be vary depending on a certain condition.

The required space length W in the right-left direction may be a total value of a door opening space length Wd and a work-space length Ww in the right-left direction. The door opening space length Wd may represent the horizontal width from the root of the door to the leading end of the door held when a side door (i.e., a door used for an occupant to get in or get out of the vehicle) is opened by a predetermined amount. In this example, the door opening space length Wd may be a fixed value held when the side door is fully opened.

In this example, the work-space length Ww may also be set to a fixed value, which may be 50 cm, for example. In alternative example, this work-space length Ww may vary depending on a certain condition.

The required space length W in the right-left direction may be determined in consideration of a space required, for example but not limited to, in a case where the side door is opened and a large piece of luggage (e.g., an elongated object) is pulled out from a passenger seat (i.e., from a space on a front side of the trunk).

Referring to FIG. 8, after the execution of the setting process in step S207, the vehicle controller 21 may terminate the process of estimating whether the user is carrying a large piece of luggage in step S103.

Referring back to FIG. 7, in step S104 following step S103, the vehicle controller 21 may perform a process of determining whether the user is carrying a large piece of luggage. In a specific but non-limiting example, the vehicle controller 21 may determine whether the possession flag fh described above is ON.

In a case where the possession flag fh is ON and where the vehicle controller 21 determines that the user is carrying a large piece of luggage (Y in step S104), the procedure may proceed to step S105. In step S105, the vehicle controller 21 may determine whether another vehicle is present around the host vehicle. In a specific but non-limiting example, on the basis of the result of an image analysis, performed by the image processor 21a, on an image captured by the camera unit 22 illustrated in FIG. 4, the vehicle controller 21 may determine whether a vehicle 2 stopping adjacent to and in front of the host vehicle (hereinafter referred to as a "front vehicle") or a vehicle 2 stopping adjacent to and behind the host vehicle (hereinafter referred to as a "back vehicle") or both are present.

In a case where the vehicle controller 21 determines that the front vehicle or the back vehicle or both are present and that another vehicle is present around the host vehicle (Y in step S105), the vehicle controller 21 may determine, in step S106, whether it is possible to secure a space without a need to move either of the host vehicle and the other vehicle.

The term "space" used in the expression "to secure a space" may include not only a space in the front-back direction (i.e., the total value of the total luggage length Ls and the work-space length Lw illustrated in FIG. 9) but also a space in the right-left direction (the required space length W illustrated in FIG. 9).

In step S106, the vehicle controller 21 may first determine whether there is a back vehicle. If there is no back vehicle, a space in the amount of the total value of the total luggage length Ls and the work-space length Lw may be secured behind the host vehicle. Thus, the vehicle controller 21 may obtain a determination result that it is possible to secure a space without a need to move either of the host vehicle and the other vehicle in the front-back direction. Meanwhile, the vehicle controller 21 may determine whether it is possible to secure a space in the right-left direction, for example, on the basis of the result of an image analysis performed by the image processor 21a. For example, the vehicle controller 21 may determine whether an object, such as another vehicle or an obstacles, away from a side of the host vehicle at a distance shorter than the required space length W is detected, and thereby determine the possibility of securing a space in the right-left direction. In another example embodiment, the distance from the host vehicle to an object around the host vehicle may be measured with a range finding sensor provided separately from the camera unit 22.

In a case where the vehicle controller 21 determines that no back vehicle is present and that it is possible to secure a space in the right-left direction, the vehicle controller 21 may obtain, in step S106, a determination result that it is possible to secure a space without a need to move either of the host vehicle and the other vehicle (Y in step S106).

In contrast, in a case where there is a back vehicle, the vehicle controller 21 may acquire a rearward distance Lr (see FIG. 10) from the rear end of the host vehicle to the front end of the back vehicle. When this rearward distance Lr is equal to or greater than the total value of the total luggage length Ls and the work-space length Lw, it may be possible to determine that it is possible to secure a space without a need to move either of the host vehicle and the other vehicle in the front-back direction.

The total vehicle length Lv may differ for each vehicle 2. In this example, it suffices that the stopping position of the vehicle 2 in the pick-up area Ab be within the pick-up spot Sb, and the vehicle 2 may stop within the pick-up spot Sb close to a front end or a back end of the pick-up spot Sb. Therefore, the rearward distance Lr may be extended depending on the size of the pick-up spot Sb. Thus, a condition where the rearward distance Lr becomes equal to or greater than the total value of the total luggage length Ls and the work-space length Lw may be satisfied without moving the host vehicle and/or the back vehicle, in some cases.

In a case where there is a back vehicle and where the vehicle controller 21 determines that the rearward distance Lr is equal to or greater than the total value of the total luggage length Ls and the work-space length Lw and thus it is possible to secure a space (i.e., the required space length W) in the right-left direction, the vehicle controller 21 may obtain, in step S106, a determination result that it is possible to secure a space without a need to move either of the host vehicle and the other vehicle (Y in step S106).

Meanwhile, in a case where the vehicle controller 21 determines that the rearward distance Lr is smaller than the total value of the total luggage length Ls and the work-space length Lw, the vehicle controller 21 may obtain, in step S106, a determination result that it is not possible to secure a space without a need to move either of the host vehicle and the other vehicle (N in step S106).

Furthermore, in a case where the vehicle controller 21 determines that it is not possible to secure a space in the right-left direction, the vehicle controller 21 may obtain, in step S106, a determination result that it is not possible to secure a space without a need to move either of the host vehicle and the other vehicle (N in step S106), regardless of the presence of a back vehicle or regardless of whether the rearward distance Lr is equal to or greater than the total value of the total luggage length Ls and the work-space length Lw.

In a case where the vehicle controller 21 determines, in step S106, that it is not possible to secure a space without a need to move either of the host vehicle and the other vehicle (N in step S106), the procedure may proceed to step S107. In step S107, the vehicle controller 21 may determine whether it is possible to secure a space just by moving the host vehicle.

Figure 10:
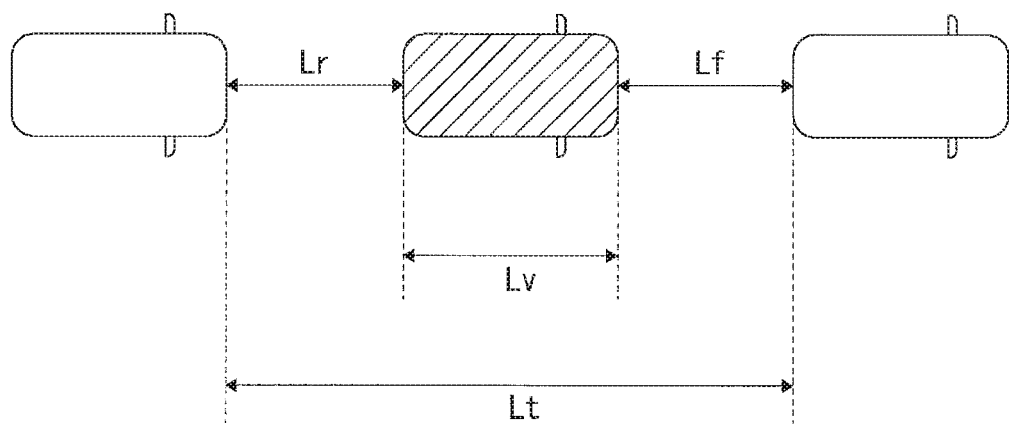
FIG. 10 is an illustration for describing a front and back inter-vehicle distance.

In this example, in order to execute the determination process in step S107, the vehicle controller 21 may calculate a front and back inter-vehicle distance Lt illustrated in FIG. 10.

As illustrated in FIG. 10, the front and back inter-vehicle distance Lt may be a total value of the rearward distance Lr described above, a forward distance Lf, and the total vehicle length Lv of the host vehicle. The forward distance Lf may be a distance from the front end of the host vehicle to the rear end of the front vehicle. The forward distance Lf may also be measured on the basis of the result of an image analysis performed by the image processor 21a, for example.

Even if the front vehicle or the back vehicle or both are present, it may be possible to secure a space required to load a large piece of luggage from behind the host vehicle just by moving the host vehicle, if the front and back inter-vehicle distance Lt is equal to or greater than the required space length L in the front-back direction described above. In other words, it may be possible to secure the space represented by "the total value of the total luggage length Ls and the work-space length Lw."

In step S107, the vehicle controller 21 may determine whether the front and back inter-vehicle distance Lt is equal to or greater than the required space length L. When the front and back inter-vehicle distance Lt is equal to or greater than the required space length L, the vehicle controller 21 may obtain a determination result that it is possible to secure a space just by moving the host vehicle (Y in step S107).

In this example, it may be possible to secure a space (i.e., the required space length W) in the right-left direction just by moving the host vehicle. Therefore, when the front and back inter-vehicle distance Lt is equal to or greater than the required space length L, the vehicle controller 21 may obtain a determination result in step S107 that it is possible to secure a space just by moving the host vehicle (Y in step S107) regardless of whether the vehicle controller 21 has determined in step S106 that it is possible to secure a space in the right-left direction without a need to move either of the host vehicle and the other vehicle.

Meanwhile, when the front and back inter-vehicle distance Lt is smaller than the required space length L, the vehicle controller 21 may obtain a determination result that it is not possible to secure a space just by moving the host vehicle (N in step S107).

In this example, in a case where no front vehicle is present, the front and back inter-vehicle distance Lt may be "∞," and it may be determined that the front and back inter-vehicle distance Lt is equal to or greater than the required space length L. In other words, in a case where both a back vehicle and a front vehicle are present, a determination result may be obtained, in step S107, that it is not possible to secure a space just by moving the host vehicle (N in step S107).

In a case where the vehicle controller 21 determines, in step S107, that it is possible to secure a space just by moving the host vehicle (Y in step S107), the procedure may proceed to step S113. In step S113, the vehicle controller 21 may perform a process of moving the host vehicle, which will be described later. Meanwhile, in a case where the vehicle controller 21 determines, in step S107, that it is not possible to secure a space just by moving the host vehicle (N in step S107), the procedure may proceed to step S108. In step S108, the vehicle controller 21 may execute a process of selecting a vehicle that needs to be moved.

Figure 11:
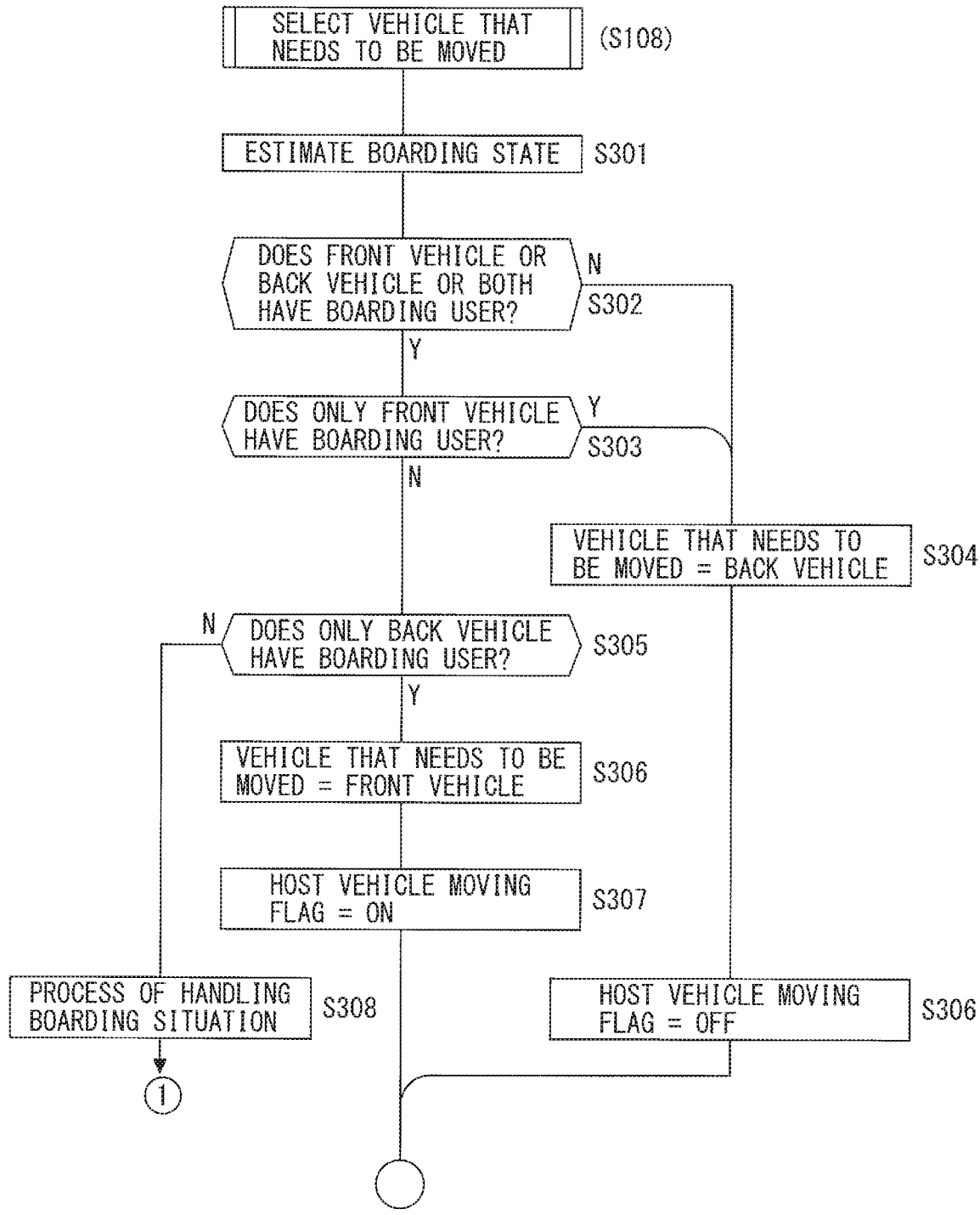
FIG. 11 is a flowchart illustrating an example of a process of selecting a vehicle that needs to be moved according to one example embodiment.

FIG. 11 is a flowchart illustrating an example of a process of selecting a vehicle that needs to be moved in step S108.

In step S301, the vehicle controller 21 may first execute a process of estimating a boarding state. In other words, the vehicle controller 21 may estimate whether each of the front vehicle and the back vehicle has a boarding user or occupant. The vehicle controller 21 may estimate whether each of the front vehicle and the back vehicle has a boarding user on the basis of the result of the image analysis performed by the image processor 21a. In one example, the vehicle controller 21 may estimate whether each of the front vehicle and the back vehicle has a boarding user by estimating whether an object continues to be detected within a predetermined distance from the front vehicle or the back vehicle for a predetermined duration or more. In an alternative example, the vehicle controller 21 may be configured to receive a door release notification from the front vehicle or the back vehicle with the use of vehicle-to-vehicle communication and may estimate whether each of the front vehicle and the back vehicle has a boarding user on the basis of whether the door release notification has been received.

In step S302, the vehicle controller 21 may determine whether the front vehicle or the back vehicle or both has a boarding user on the basis of the result of the estimating process in step S301.

When neither of the front vehicle and the back vehicle has a boarding user (N in step S302), the procedure may proceed to step S304. In step S304, the vehicle controller 21 may select the back vehicle as a vehicle that needs to be moved.

In this manner, in this example where both the front vehicle and the back vehicle are present, the back vehicle may be moved preferentially, in consideration of that a large piece of luggage is put into the vehicle 2 by the trunk door in the rear portion of the vehicle 2.

Meanwhile, in a case where the vehicle controller 21 determines, in step S302, that the front vehicle or the back vehicle or both have a boarding user (Y in step S302), the procedure may proceed to step S303. In step S303, the vehicle controller 21 may determine whether only the front vehicle has a boarding user. If only the front vehicle has a boarding user (Y in step S303), the procedure may proceed to step S304. In step S304, the vehicle controller 21 may select the back vehicle as a vehicle that needs to be moved. In other words, the vehicle controller 21 may refrain from selecting a vehicle that is estimated to have a boarding user as a vehicle that needs to be moved. This configuration makes it possible to improve the safety of a user of another vehicle (in this case, the user of the front vehicle).

In a case where the vehicle controller 21 determines, in step S303, that only the back vehicle has a boarding user or that both the front vehicle and the back vehicle have boarding users (N in step S303), the procedure may proceed to step S305. In step S305, the vehicle controller 21 may determine whether only the back vehicle has a boarding user.

In a case where only the back vehicle has a boarding user (Y in step S305), the procedure may proceed to step S306. In step S306, the vehicle controller 21 may set the front vehicle as a vehicle that needs to be moved. Thereafter, in step S307, the vehicle controller 21 may set a host-vehicle moving flag fm to ON and terminate the selecting process in step S108. In this example, the host-vehicle moving flag fm may be used for identifying whether the host vehicle needs to be moved. The host-vehicle moving flag fm being ON may indicate that the host vehicle needs to be moved. The initial value of the host-vehicle moving flag fm may be OFF.

In this example, in a case where the back vehicle is selected as a vehicle that needs to be moved in step S304, the vehicle controller 21 may set, in step S309, the host-vehicle moving flag fm to OFF and terminate the selecting process in step S108.

In contrast, in a case where the vehicle controller 21 determines, in step S305, that both the front vehicle and the back vehicle have boarding users (N in step S305), the vehicle controller 21 may execute, in step S308, a process of handling a boarding situation, and the procedure may proceed to a process in step S112 illustrated in FIG. 7 (i.e., a process of checking the host-vehicle moving flag fm).

In the automated valet parking system of this example, the vehicle 2 into which the user has gotten into may start moving from the stopping position and exit the pick-up area Ab. Therefore, in the process of handling a boarding situation in step S308, the vehicle controller 21 may first stand by until either one of the front vehicle and the back vehicle starts moving. If the vehicle 2 that has started moving is the back vehicle, the vehicle controller 21 may keep the host-vehicle moving flag fm to OFF, and the procedure may proceed to step S112. If the vehicle 2 that has started moving is the front vehicle, the vehicle controller 21 may set the host-vehicle moving flag fm to ON, and the procedure may proceed to the step S112.

If the vehicle that has started moving is the back vehicle, a space (Ls+Lw) required for loading may be secured behind the host vehicle without moving the host vehicle. Meanwhile, in a case where the vehicle that has started moving is the front vehicle, it may not be possible to secure a space required for loading unless the host vehicle moves forward. Therefore, the vehicle controller 21 may set the host-vehicle moving flag fm to ON as described above and cause the host vehicle to move.

The description continues with reference back to FIG. 7.

In step S109 following step S108, the vehicle controller 21 may calculate a required moving amount for another vehicle. This required moving amount for the other vehicle may be the amount by which the other vehicle needs to be moved in the front-back direction. In a specific but non-limiting example, the value calculated by the vehicle controller 21 may differ in between a case where the front vehicle has been selected as a vehicle that needs to be moved and a case where the back vehicle has been selected as a vehicle that needs to be moved.

In other words, in a case where the back vehicle has been selected as a vehicle that needs to be moved, the required moving amount for the other vehicle may be obtained by subtracting the rearward distance Lr from the space required for loading (i.e., the total value of the total luggage length Ls and the work-space length Lw in the front-back direction). When the back vehicle is moved rearward at least by this required moving amount, it may become possible to secure the space (Ls+Lw) required for loading behind the host vehicle without moving the host vehicle.

In a case where the front vehicle has been selected as a vehicle that needs to be moved, the required moving amount for the other vehicle may be obtained by subtracting the front and back inter-vehicle distance Lt from the required space length L in the front-back direction. When the front vehicle is moved forward at least by this required moving amount, it may become possible to secure the space (Ls+Lw) required for loading behind the host vehicle as the host vehicle moves forward. In a case where a vehicle that needs to be moved is the front vehicle, the host-vehicle moving flag fm may have been set in step S307.

In step S110 following step S109, the vehicle controller 21 may issue an instruction to the coordinating device 1 on the vehicle that needs to be moved and the required moving amount.

Upon receiving this instruction through the process in step S110, that is, upon receiving this instruction from the target vehicle 2, the controller 11 of the coordinating device 1 may perform control of moving, out of the vehicles 2 waiting in the pick-up area Ab, the vehicle 2 that has been designated as the vehicle that needs to be moved in accordance with the instructed required moving amount.

In a specific but non-limiting example, in a case where the designated vehicle that needs to be moved is the front vehicle, the controller 11 may perform control of moving the front vehicle forward by at least the instructed required moving amount or more. At this point, in a case where there is another vehicle 2 waiting in front of the front vehicle, the controller 11 may determine whether a space equal to or greater than the instructed required moving amount is present between the front vehicle and the vehicle in front of the front vehicle. In a case where such a space is present, the controller 11 may cause the front vehicle to move forward by the required moving amount. Meanwhile, in a case where such a space is not present, the controller 11 may cause the front vehicle to move obliquely forward so that a space equal to or greater than the required moving amount is secured in front of the target vehicle.

In a case where the designated vehicle that needs to be moved is the back vehicle behind the host vehicle, the controller 11 may perform control of moving the back vehicle rearward by at least the instructed required moving amount or more. At this point, in a case where there is another vehicle 2 waiting behind the back vehicle, the controller 11 may determine whether a space equal to or greater than the instructed required moving amount is present between the back vehicle and the vehicle behind the back vehicle, as in the case of the control performed for the front side described above. In a case where such a space is present, the controller 11 may cause the back vehicle to move rearward by the required moving amount. In a case where such a space is not present, the controller 11 may cause the back vehicle to move obliquely rearward so that the space equal to or greater than the required moving amount is secured behind the target vehicle.

When completing the movement under the control of the controller 11, the vehicle 2 (i.e., the vehicle controller 21) serving as the front vehicle or the back vehicle may notify the controller 11 of the completion of the movement.

In response to the notification of completion of the movement, the controller 11 may notify the vehicle controller 21 in the target vehicle of the completion of the movement.

The vehicle controller 21 may wait, in step S111, for such a notification of completion of the movement from the controller 11. In a case where the vehicle controller 21 receives no notification of completion of the movement (N in step S111), the vehicle controller 21 may again execute the process in step S111. This may cause the process in step S111 to be repeated until the vehicle controller 21 receives the notification of completion of the movement. In a case where the vehicle controller 21 receives the notification of completion of the movement (Y in step S111), the vehicle controller 21 may determine, in step S112, whether the host-vehicle moving flag fm is ON.

In this example, the host-vehicle moving flag fm may be ON in step S307 illustrated in FIG. 11 in which the front vehicle is selected as a vehicle that needs to be moved and in step S308 illustrated in FIG. 11 in which the front vehicle having a boarding user starts moving.

In a case where the host-vehicle moving flag fm is ON in step S112 (Y in step S112), the procedure may proceed to step S113. In step S113, the vehicle controller 21 may perform a process of moving the host vehicle. In other words, the vehicle controller 21 may cause the host vehicle to move so that the rearward distance Lr from the host vehicle becomes equal to or greater than the space (Ls+Lw) required for loading in the front-back direction. In addition, in a case where the determination result has been obtained in step S106 that it is not possible to secure a space in the right-left direction (N in step S106), in step S113, the vehicle controller 21 may so move the host vehicle as to secure not only the required space length in the front-back direction but also the required space length W in the right-left direction. The moving process in step S113 may also be performed in a case where the vehicle controller 21 has determined in step S107 that it is possible to secure the space just by moving the host vehicle (Y in step S107).

After the execution of the moving process in step S113, the procedure may proceed to step S114. In addition, in a case where the vehicle controller 21 determines, in step S112, that the host-vehicle moving flag fm is not ON (N in step S112), the process of the procedure may proceed to step S114 as well.

In step S114, the vehicle controller 21 may determine whether the possession flag fh is ON. In this example, in a case where the process has moved from step S112 to step S114 or from step S113 to step S114, the possession flag fh may be ON.

When the possession flag fh is ON (Y in step S114), the vehicle controller 21 may execute, in step S115, a process of handling a situation where a trunk door is open and terminate the series of processes illustrated in FIG. 7.

In the process of handling the situation where the trunk door is open in step S115, the vehicle controller 21 may stand by until the trunk door enters an open state. When the trunk door enters an open state, the vehicle controller 21 may control the latch actuator 29 described above to perform a process of causing the latch mechanism of the backseat to enter the latch disengaged state, namely a process of switching the backrest portion of the backseat into the forward foldable state.

Thus, when a large piece of luggage is loaded into the trunk by the trunk door, pushing the large piece of luggage into the vehicle may cause the backrest portion of the backseat (i.e., the trunk adjacent seat) to be naturally folded forward, making it easier to load the large piece of luggage into the vehicle.

An air mechanism or another mechanism may be provided that keeps the backrest portion from being folded rapidly when the latch is disengaged or when the luggage is pushed into the vehicle as described above, and thus a damper effect may be provided.

Meanwhile, when the possession flag fh is OFF (N in step S114), the vehicle controller 21 may skip the process in step S115 and terminate the series of processes illustrated in FIG. 7.

In a case where the vehicle controller 21 determines, in step S104 described above, that the user is not carrying a large piece of luggage (N in step S104), the procedure may proceed to step S114. In this case, since a determination may be made, in step S114, that the possession flag fh is not ON, the process of handling the situation where the trunk door is open in step S115 may not be executed.

Furthermore, in a case where the vehicle controller 21 determines, in step S105 described above, that no other vehicle is present (N in step S105), the process of the procedure may proceed to step S114. In addition, in a case where the vehicle controller 21 determines, in step S106, that it is possible to secure the space without a need to move either of the host vehicle and the other vehicle (Y in step S106) as well, the procedure may proceed to step S114.

In this case, the vehicle controller 21 may determine, in step S114, that the possession flag fh is ON (Y in step S114), and thus the process of handling the situation where the trunk door is open may be executed in step S115.

In the foregoing description regarding the estimation of whether the user is carrying a large piece of luggage, it is possible to acquire only the information on the monetary amount paid for the purchase and the information on the store of purchase, as the user's purchased merchandise information. In an alternative example where it is possible to acquire the size information of the merchandise as the user's purchased merchandise information, whether the user is carrying a large piece of luggage may be estimated on the basis of this size information.

In another example where vehicle-to-vehicle communication is available, the target vehicle may transmit, in step S110, the instruction to move another vehicle directly to the other vehicle instead of the coordinating device 1 as described above.

The instruction in step S110 may be one example mode of the control of cause another vehicle to move according to the example embodiment.

5. Modification Examples

In the foregoing example, whether the user is carrying a large piece of luggage may be estimated on the basis of the user's purchased merchandise information. In an alternative example, it may be possible to estimate whether the user is carrying a large piece of luggage on the basis of the camera image.

Figure 12:
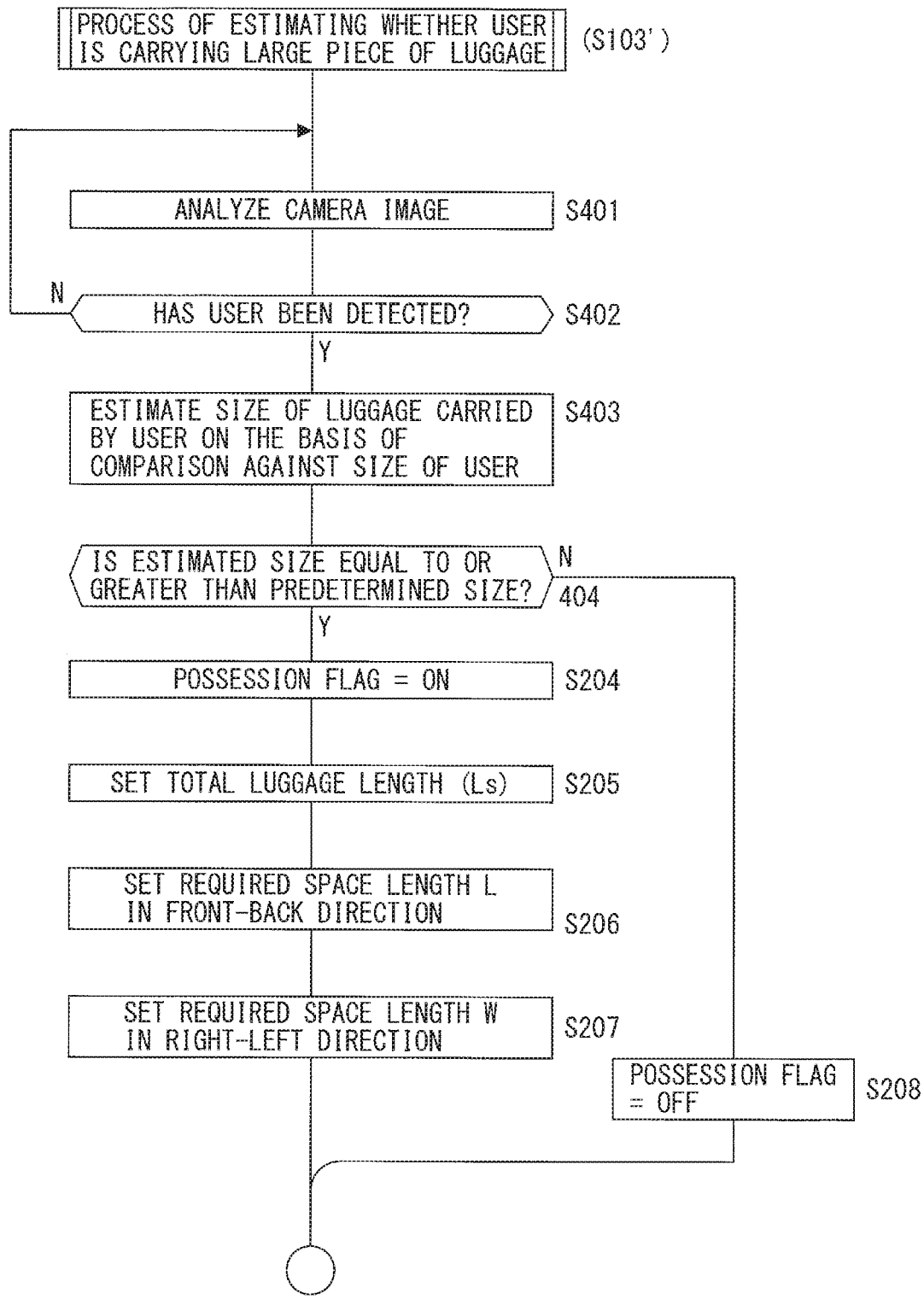
FIG. 12 is a flowchart illustrating an example of a process of estimating whether a user is carrying a large piece of luggage according to a modification example.

FIG. 12 is a flowchart illustrating an example of a process (step S103') of estimating whether a user is carrying a large piece of luggage, which process may be executed in the alternative example. The vehicle controller 21 in this example may execute an estimating process in step S103' illustrated in FIG. 12, in place of the estimating process in step S103.

This process may differ from the process illustrated in FIG. 8 in that steps S401 to S404 are executed in place of steps S201 to S203.

In step S401, the vehicle controller 21 may first execute a process of analyzing the camera image. In this analyzing process, the vehicle controller 21 may cause the image processor 21a described above to perform a process of detecting an object having a feature of the user within the image captured by the camera unit 22. In a specific but non-limiting example, an image portion corresponding to a human face may be detected within the captured image with the use of a face recognition technique, for example. Thereafter, matching may be performed between a feature amount of the detected image portion and a feature amount of the user's face set in advance. When the result of the matching indicates that the feature amount of the image portion has approximation with the feature amount of the user's face to a degree equal to or greater than a predetermined degree, the image portion may be detected or recognized as a portion corresponding to the user's face. In addition, an object including the image portion may be detected or recognized as the user.

In step S402, the vehicle controller 21 may determine whether the user has been detected through the analyzing process in step S401. In a case where the user has not been detected (N in step S402), the vehicle controller 21 may again execute the process in step S401. Thus, the processes in steps S401 and S402 may be repeated until the user is detected.

In a case where the user has been detected (Y in step S402), the vehicle controller 21 may estimate, in step S403, the size of the luggage carried by the user through a comparison against the size of the user. In other words, for example, the vehicle controller 21 may recognize, as the luggage carried by the user, an object that maintains a predetermined positional relationship with respect to the image portion corresponding to the user and estimate the size of this luggage through a comparison between the size of the image portion corresponding to the user and the size of the image portion recognized as the luggage. For example, a reference height, such as an average height of a typical adult, may be set as the size of the user, and the reference height may be multiplied by a size ratio between the image portion corresponding to the user and the image portion corresponding to the luggage. The vehicle controller 21 may thereby estimate the size of the luggage.

In step S404 following step S403, the vehicle controller 21 may determine whether the estimated size is equal to or greater than a predetermined size. When the size estimated in step S403 is smaller than the predetermined size (N in step S404), the vehicle controller 21 may set, in step S208, the possession flag fh to OFF and terminate the estimating process in step S103'. When the estimated size is equal to or greater than the predetermined size (Y in step S404), the vehicle controller 21 may execute the processes in steps S204 to S207 described above and terminate the estimating process in step S103'.

In another example embodiment, the position information of the mobile terminal 3 carried by the user and an image from a camera installed in the pick-up area Ab may be used in combination to detect the user in the camera image.

In another example embodiment, an image from a camera installed in the pick-up area Ab may be used in combination to estimate the size of the luggage carried by the user.

In another example embodiment, whether the user is carrying a large piece of luggage may be estimated on the basis of both the user's purchased merchandise information and the camera image. In a conceivable example, the estimation may be made on the basis of each of the user's purchased merchandise information and the camera image, and the possession flag fh may be set to ON as both estimations indicate that the user is carrying a large piece of luggage.

Out of the processes for implementing the vehicle controlling method according to the example embodiment described thus far, at least a portion of the process to be executed in the vehicle 2 may be performed instead in the coordinating device 1. In a specific but non-limiting example, the process for estimating whether the user is carrying a large piece of luggage (corresponding to S103 and S103'), the process of estimating whether another vehicle is stopping (corresponding to S105 to S108), and the process of causing another vehicle to move on the basis of the result of estimating whether the user is carrying a large piece of luggage and the result of estimating whether another vehicle is stopping (corresponding to S108 to S110) may be performed in the coordinating device 1.

In an example case where whether the user is carrying a large piece of luggage is estimated with the use of the user's purchased merchandise information, the mobile terminal 3 may transmit the information on the monetary amount paid for purchase to the coordinating device 1 (i.e., the controller 11), and the controller 11 may acquire the information on the store of purchase on the basis of the position information of the mobile terminal 3 to manage the user's purchased merchandise information. In another example case where the estimation is made with the use of a camera image, it may be conceivable to estimate whether the user is carrying a large piece of luggage by detecting the user and by estimating the size of the luggage on the basis of an image from the camera unit 22 of the vehicle 2 or an image from a camera installed in the pick-up area Ab, for example.

In an alternative example embodiment, on the basis of the image from a camera installed in the pick-up area Ab, the process of estimating whether another vehicle is stopping or the process of causing another vehicle to move on the basis of: the result of estimating whether the user is carrying a large piece of luggage; and the result of estimating whether another vehicle is stopping, may be performed using a technique similar to that in the process performed in the vehicle 2 described above. In a case where the target vehicle needs to be moved in the alternative example embodiment, the required moving amount for the target vehicle may be calculated, and an instruction on the required moving amount may be transmitted to the target vehicle.

With regard to the process of handling the situation where the trunk door is open in step S115, the controller 11 may instruct the target vehicle to execute this process on the basis of the result of the process of estimating whether the user is carrying a large piece of luggage performed by the controller 11.

The possession estimator F1 and the status estimator F2 described with reference to FIG. 6 may be configured to obtain the estimation information as the vehicle controller 21 performs the estimation. Alternatively, an external device, such as another vehicle 2, may estimate whether the user is carrying a large piece of luggage or estimate whether another vehicle is stopping, for example, and the vehicle controller 21 may acquire the estimation information from this external device.

The foregoing description is made on the assumption that a plurality of vehicles 2 stops front to back in the pick-up area Ab. The technology, however, may also be applied suitably to a case where a plurality of vehicles 2 stops side to side in the pick-up area Ab. Stopping "side to side" may mean a state in which a plurality of vehicles 2 is arrayed in the right-left direction with the right-left direction of the vehicle 2 being a reference.

In a case where a plurality of vehicles 2 stops side to side, whether a required space is secured in the right-left direction may become a main issue. Therefore, in this case, it may be determined whether a space required for loading a large piece of luggage is secured in the right-left direction on the basis of the result of estimating whether another vehicle is stopping. In a case where such a space is not secured, control of causing another vehicle to move may be performed.

In a case where the vehicles 2 stop side to side, a conceivable example of the control of causing another vehicle to move may involve moving forward (or rearward) another vehicle once, and moving back the moved vehicle to its original position at a timing at least after the loading of the luggage into the target vehicle.

The operation in which the moved target vehicle is moved back to its original position (i.e., at least the operation in which the target vehicle is moved back into the pick-up spot Sb where the target vehicle has been stopping originally) at least after the completion of loading of the luggage into the target vehicle, may be performed similarly also in a case where the vehicles stop front to back.

The foregoing description is made on the assumption that the pick-up system according to the example embodiment is applied to an automated valet parking system and that the vehicle 2 moves to or parks itself in the parking lot Ap through the automatic driving. Alternatively, the pick-up system according to the example embodiment may be suitably applied to a case where the vehicle 2 is moved to the parking lot Ap and/or is parked in a parking spot through the driving of the vehicle 2 by the driver.

6. Recapitulation of Embodiments

As described above, a vehicle controller (i.e., a vehicle controller 21) according to an example embodiment includes a possession estimator (i.e., a possession estimator F1), a status estimator (i.e., a status estimator F2), and a movement controller (i.e., a movement controller F3). The possession estimator is configured to obtain estimation information with regard to a target vehicle that stops in a pick-up area (i.e., a pick-up area Ab) where a plurality of vehicles (i.e., vehicles 2) is allowed to stop waiting for a user or an occupant to get therein. The estimation information indicates whether the user of the target vehicle is carrying a large piece of luggage having a size equal to or greater than a predetermined size. The status estimator (i.e., a status estimator F2) configured to obtain estimation information on an other-vehicle stopping status. The other-vehicle stopping status indicates a status of another vehicle stopping around the target vehicle. The movement controller is configured to cause another vehicle to move on the basis of the estimation information obtained by the possession estimator and the estimation information obtained by the status estimator. In one embodiment, the vehicle controller 21 may serve as an "information processor". In one embodiment, the possession estimator may serve as a "first estimator". In one embodiment, the status estimator may serve as a "second estimator". In one embodiment, the movement controller may serve as a "first controller".

As described above, the other vehicle stopping status may be a concept that includes at least the presence of another vehicle around the target vehicle and the positional relationship of the other vehicle with respect to the target vehicle. Estimating such an other-vehicle stopping status may make it possible to estimate the size of an available space around the target vehicle.

Therefore, in a case where it is estimated that the user is going to load a large piece of luggage into the target vehicle but where it is estimated that it is not possible to secure a space for loading around the target vehicle, it may become possible to secure a space for loading by moving another vehicle on the basis of the estimation information as to whether the user is carrying a large piece of luggage and the estimation information on the other vehicle stopping status.

Accordingly, it is possible to make it easier to load a large piece of luggage without a need to secure a large stopping space for each vehicle in the pick-up area. In other words, it is possible to increase the number of vehicles that are allowed to park in the pick-up area while ensuring the ease of loading a large piece of luggage.

In the vehicle controller according to some of the foregoing example embodiment, the possession estimator may obtain the estimation information that estimates whether the user is carrying a large piece of luggage on the basis of the user's purchased merchandise information.

Thus, it suffices that the user of the target vehicle purchase merchandise to allow the possession estimator to estimate whether the user is carrying a large piece of luggage. In other words, no particular operation may be needed to notify the vehicle controller that the user is carrying a large piece of luggage.

Accordingly, it is possible to improve the user-friendliness.

In the vehicle controller according to some of the foregoing example embodiments, the possession estimator may obtain the estimation information on the result of the estimation of whether the user is carrying a large piece of luggage on the basis of the camera image.

This renders it unnecessary for the user to carry a mobile terminal that is configured to transmit the user's purchased merchandise information in order to allow the possession estimator to estimate whether the user is carrying a large piece of luggage, and no particular operation may be needed by the user in order to notify the vehicle controller that the user is carrying a large piece of luggage.

Accordingly, it is possible to improve the user-friendliness.

In the vehicle controller according to some of the foregoing example embodiments, the movement controller may cause a back vehicle to move preferentially in a case where vehicles are stopping in front of and behind the target vehicle.

A large piece of luggage may tend to be loaded by the trunk door in the rear portion of the vehicle. Therefore, causing the back vehicle to move preferentially as described above may render it unnecessary to cause both the front vehicle and the target vehicle to move in order to secure the loading space.

Accordingly, it is possible to increase the efficiency in moving vehicles to secure the loading space.

In the vehicle controller according to some of the foregoing example embodiments, the movement controller may estimate whether is another vehicle has a boarding user and select the other vehicle having no boarding user as a vehicle that is to be moved.

This makes it possible to prevent a vehicle having a boarding user from being moved.

Accordingly, it is possible to ensure the safety of the user of the other vehicle. In the vehicle controller according to some of the foregoing example embodiments, the target vehicle may include a latch mechanism that is able to switch a backrest portion of a seat adjacent to a trunk between a forward foldable state and a forward unfoldable state, and a latch controller (i.e., a latch actuator 29 and the vehicle controller 21) configured to control the latch mechanism to bring the backrest portion into the forward foldable state on the basis of the estimation information obtained by the possession estimator.

Thus, when a large piece of luggage is loaded into the trunk by the trunk door, pushing the large piece of luggage may cause the backrest portion of the trunk adjacent seat to be naturally folded forward.

Accordingly, it becomes easier to load a large piece of luggage, and it is possible to improve the user-friendliness.

A computer readable recording medium that includes a program according to an example embodiment may cause an information processor to implement a method including: obtaining estimation information with regard to a target vehicle that stops in a pick-up area where a plurality of vehicles is allowed to stop waiting for a user an occupant to get therein, in which the user is an occupant of corresponding one of the vehicles, and the estimation information indicates whether the user of the target vehicle is carrying a large piece of luggage having a size equal to or greater than a predetermined size; obtaining estimation information on an other-vehicle stopping status that indicates a status of another vehicle stopping around the target vehicle; and causing another vehicle to move on the basis of the estimation information obtained and the estimation information. In other words, the computer readable recording medium may cause a computer device (i.e., the information processor) to execute the processes described with reference to, for example, FIGS. 7, 8, and 11.

The vehicle controller according to the example embodiment described above is implemented by the computer readable recording medium that includes a program according to an example embodiment. Accordingly, it is possible to increase the number of vehicles that are allowed to park in the pick-up area while ensuring the ease of loading a large piece of luggage.

The vehicle controller 21 illustrated in FIG. 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle controller 21. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the vehicle controller 21 illustrated in FIG. 4.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle controller comprising:
   at least one non-transitory machine readable medium storing instructions; and
   at least one processor configured to execute the instructions to:
   obtain first estimation information of luggage being carried by a user of a target vehicle, wherein the target vehicle is stopped in a pick-up area where vehicles are allowed to stop and wait for respective users to board therein, and wherein the user carrying the luggage approaches the target vehicle stopped in the pick-up area;

determine whether the user of the target vehicle is carrying a piece of luggage having a size equal to or greater than a predetermined size based on the obtained first estimation information;

obtain second estimation information including statuses of other vehicles stopped around the target vehicle;

determine, based on the obtained second estimation information, that 1) the other vehicles include i) a front vehicle stopped adjacent to and in front of the target vehicle and ii) a back vehicle stopped adjacent to and behind the target vehicle such that the front vehicle and the back vehicle sandwiches the target vehicle in a front-back direction, 2) an inter-vehicle distance between the front vehicle and the back vehicle, and 3) a rearward distance between the target vehicle and the back vehicle;

compare the inter-vehicle distance between the front vehicle and the back vehicle to a first predetermined distance;

compare the rearward distance between the target vehicle and the back vehicle to a second predetermined distance, wherein the first predetermined distance is set to be equal to or greater than a sum of a length of the target vehicle and the second predetermined distance; and in response to determining that i) the user of the target vehicle is carrying the piece of luggage having the size equal to or greater than the predetermined size ii) the inter-vehicle distance between the front vehicle and the back vehicle is less than a first predetermined distance, and iii) the rearward distance between the target vehicle and the back vehicle is less than a second predetermined distance, cause the back vehicle to move such that the rearward distance between the target vehicle and the back vehicle becomes equal to or greater than the second predetermined distance.

2. The vehicle controller according to claim 1,
wherein the first estimation information includes purchased merchandise information regarding one or more merchandises purchased by the user of the target vehicle since the user of the target vehicle last exited the target vehicle, and
wherein the at least one processor is configured to execute the instructions to determine whether the user of the target vehicle is carrying the piece of luggage based on the purchased merchandise information.

3. The vehicle controller according to claim 2,
wherein the first estimation information includes an image captured by a camera unit, and
wherein the at least one processor is configured to execute the instructions to determine whether the user of the target vehicle is carrying the piece of luggage based on the captured image included in the first estimation information.

4. The vehicle controller according to claim 2,
wherein the purchased merchandise information includes information on a monetary amount paid for the one or more merchandises and shop information of one or more shops where the user of the target vehicle purchased the one or more merchandises, and
wherein the at least one processor is configured to execute the instructions to:

calculate an estimation value based on the monetary amount and the shop information, wherein the estimation value increases as i) the monetary amount increases, ii) the shop information includes information of a shop that sells large-sized merchandises, or iii) both;

when the estimation value is equal to or greater than a predetermined threshold value, determine that the user of the target vehicle is carrying the piece of luggage having the size equal to or greater than the predetermined size; and when the estimation value is smaller than the predetermined threshold value, determine that the user of the target vehicle is not carrying the piece of luggage having the size equal to or greater than the predetermined size.

5. The vehicle controller according to claim 1,
wherein the first estimation information includes an image captured by a camera unit, and
wherein the at least one processor is configured to execute the instructions to determine whether the user of the target vehicle is carrying the piece of luggage based on the captured image included in the first estimation information.

6. The vehicle controller according to claim 1, wherein the at least one processor is configured to execute the instructions to:

determine whether the back vehicle is able to move; and in response to determining that i) the user of the target vehicle carrying the piece of luggage, ii) the inter-vehicle distance between the front vehicle and the back vehicle is less than the first predetermined distance, iii) the rearward distance between the target vehicle and the back vehicle is less than the second predetermined distance, and iv) the back vehicle is unable to move, cause the front vehicle to move such that the inter-vehicle distance becomes equal to or greater than the first predetermined distance.

7. The vehicle controller according to claim 6, wherein the at least one processor is configured to execute the instructions to:

determine whether a user of the back vehicle is boarding the back vehicle based on an image of the back vehicle captured by a camera unit; and in response to determining that the user of the back vehicle is boarding the back vehicle, determine that the back vehicle is unable to move.

8. The vehicle controller according to claim 1,
wherein the target vehicle includes a latch mechanism that is able to switch a backrest portion of a seat adjacent to a trunk between a forward foldable state and a forward unfoldable state, and
wherein the at least one processor is configured to execute the instructions to cause the latch mechanism to bring the backrest portion into the forward foldable state in response to determining that the user of the target vehicle is carrying the piece of luggage.

9. The vehicle controller according to claim 1, wherein the first predetermined distance and the second predetermined distance are calculated based on a length of the piece of luggage.

10. A non-transitory computer readable recording medium including a program that causes an information processor to implement a method, the method comprising:

obtaining first estimation information of luggage being carried by a user of a target vehicle, wherein the target vehicle is stopped in a pick-up area where vehicles are allowed to stop and wait for respective users to board therein, and wherein the user carrying the luggage approaches the target vehicle stopped in the pick-up area;

determining whether the user of the target vehicle is carrying a piece of luggage having a size equal to or greater than a predetermined size based on the obtained first estimation information;

obtaining second estimation information statuses of other vehicles stopped around the target vehicle;

determining, based on the obtained second estimation information, that 1) the other vehicles include i) a front vehicle stopped adjacent to and in front of the target vehicle and ii) a back vehicle stopped adjacent to and behind the target vehicle such that the front vehicle and the back vehicle sandwiches the target vehicle in a front-back direction, 2) an inter-vehicle distance between the front vehicle and the back vehicle, and 3) a rearward distance between the target vehicle and the back vehicle;

comparing the inter-vehicle distance between the front vehicle and the back vehicle to a first predetermined distance;

comparing the rearward distance between the target vehicle and the back vehicle to a second predetermined distance, wherein the first predetermined distance is set to be equal to or greater than a sum of a length of the target vehicle and the second predetermined distance; and in response to determining that i) the user of the target vehicle is carrying the piece of luggage having the size equal to or greater than the predetermined size, ii) the inter-vehicle distance between the front vehicle and the back vehicle is less than the first predetermined, and iii) the rearward distance between the target vehicle and the back vehicle is less than a second predetermined distance, causing the back vehicle to move such that the rearward distance between the target vehicle and the back vehicle becomes equal to or greater than the second predetermined distance.

11. A vehicle controller comprising circuitry configured to:

obtain first estimation information of luggage being carried by a user of a target vehicle, wherein the target vehicle is stopped in a pick-up area where vehicles are allowed to stop and wait for respective users to board therein, and wherein the user carrying the luggage approaches the target vehicle stopped in the pick-up area;

determine whether the user of the target vehicle is carrying a piece of luggage having a size equal to or greater than a predetermined size based on the obtained first estimation information;

obtain second estimation information including statuses of other vehicles stopped around the target vehicle;

determine, based on the obtained second estimation information, that 1) the other vehicles include i) a front vehicle stopped adjacent to and in front of the target vehicle and ii) a back vehicle stopped adjacent to and behind the target vehicle such that the front vehicle and the back vehicle sandwiches the target vehicle in a front-back direction, 2) a forward distance between the target vehicle and the front vehicle, 3) a rearward distance between the target vehicle and the back vehicle, and 4) a sum of the forward distance and the rearward distance;

compare the sum of the forward distance and the rearward distance to a first predetermined distance;

compare the rearward distance between the target vehicle and the back vehicle to a second predetermined distance, wherein the first predetermined distance is set to be equal to or greater than the second predetermined distance; and in response to determining that i) the user of the target vehicle is carrying the piece of luggage having the size equal to or greater than the predetermined size, ii) the sum of the forward distance and the rearward distance is less than the first predetermined distance, and iii) the rearward distance id less than the second predetermined distance, cause the back vehicle to move such that the rearward distance between the target vehicle and the back vehicle becomes equal to or greater than the second predetermined distance.

12. The vehicle controller according to claim 11, wherein the first estimation information includes purchased merchandise information regarding one or more merchandises purchased by the user of the target vehicle since the user of the target last exited the target vehicle, and wherein the circuitry is configured to determine whether the user of the target vehicle is carrying the piece of luggage based on the purchased merchandise information.

13. The vehicle controller according to claim 12, wherein the purchased merchandise information includes information of a monetary amount paid for the one or more merchandises and shop information of one or more shops where the user of the target vehicle purchased the one or more merchandises, and wherein the circuitry is configured to:

calculate an estimation value based on the monetary amount and the shop information, wherein the estimation value increases as i) the monetary amount increases, ii) the shop information includes information of a shop that sells large-sized merchandises, or iii) both;

when the estimation value is equal to or greater than a predetermined threshold value, determine that the user of the target vehicle is carrying the piece of luggage having the size equal to or greater than the predetermined size; and when the estimation value is smaller than the predetermined threshold value, determine that the user of the target vehicle is not carrying the piece of luggage having the size equal to or greater than the predetermined size.

14. The vehicle controller according to claim 12, wherein the first estimation information includes an image captured by a camera unit, and wherein the circuitry is configured to determine whether the user of the target vehicle is carrying the piece of luggage based on the captured image included in the first estimation information.

15. The vehicle controller according to claim 11, wherein the first estimation information includes an image captured by a camera unit, and wherein the circuitry is configured to determine whether the user of the target vehicle is carrying the piece of luggage based on the image.

16. The vehicle controller according to claim 11, wherein the circuitry is configured to:

determine whether the back vehicle is able to move; and in response to determining that i) the user of the target vehicle is carrying the piece of luggage, ii) the sum of the forward distance and the rearward distance is less than the first predetermined distance, iii) the rearward distance is less than the second predetermined distance, and iv) the back vehicle is unable to move, cause the front vehicle to move such that the sum of the forward distance and the rearward distance becomes equal to or greater than the first predetermined distance.

17. The vehicle controller according to claim 16, wherein the circuitry is configured to:
   determine whether a user of the back vehicle is boarding the back vehicle based on an image of the back vehicle captured by a camera unit; and
   in response to determining that the user of the back vehicle is boarding the back vehicle, determine that the back vehicle is unable to move.

18. The vehicle controller according to claim 11,
   wherein the target vehicle includes a latch mechanism that is able to switch a backrest portion of a seat adjacent to a trunk between a forward foldable state and a forward unfoldable state, and
   wherein the circuitry is configured to cause the latch mechanism to bring the backrest portion into the forward foldable state in response to determining that the user of the target vehicle is carrying the piece of luggage.

19. The vehicle controller according to claim 11, wherein the first predetermined distance and the second predetermined distance are calculated based on a length of the piece of luggage obtained from the first estimation information.

* * * * *

UNITED STATES PATENT AND TRADEMARK OFFICE
CERTIFICATE OF CORRECTION

PATENT NO. : 11,628,828 B2
APPLICATION NO. : 16/460331
DATED : April 18, 2023
INVENTOR(S) : Seki It is certified that error appears in the above-identified patent and that said Letters Patent is hereby corrected as shown below:

On the Title Page

Please add in Item (30):
(30) Foreign Application Priority Data
2018-09-28    (JP)    2018-184260

Signed and Sealed this
Twentieth Day of August, 2024

Katherine Kelly Vidal
*Director of the United States Patent and Trademark Office*